(12) United States Patent
Pye

(10) Patent No.: US 9,926,035 B2
(45) Date of Patent: Mar. 27, 2018

(54) SUSPENSION SYSTEM

(71) Applicant: Hayes Bicycle Group Inc., Mequon, WI (US)

(72) Inventor: Nicholas William Pye, Carrboro, NC (US)

(73) Assignee: Hayes Bicycle Group Inc., Mequon, WI (US)

( * ) Notice: Subject to any disclaimer, the term of this patent is extended or adjusted under 35 U.S.C. 154(b) by 120 days.

(21) Appl. No.: 14/754,650

(22) Filed: Jun. 29, 2015

(65) Prior Publication Data

US 2016/0001846 A1 Jan. 7, 2016

Related U.S. Application Data

(60) Provisional application No. 62/021,114, filed on Jul. 5, 2014.

(51) Int. Cl.
*B62K 25/08* (2006.01)
*F16F 9/44* (2006.01)
(Continued)

(52) U.S. Cl.
CPC ............ *B62K 25/08* (2013.01); *B60G 15/061* (2013.01); *B60G 15/12* (2013.01); *B60G 17/08* (2013.01);
(Continued)

(58) Field of Classification Search
CPC .. B62K 25/08; B62K 2025/04; B60G 15/061; B60G 15/12; B60G 17/08;
(Continued)

(56) References Cited

U.S. PATENT DOCUMENTS

| 4,245,826 A * | 1/1981 | Wirges | A47C 3/30 188/300 |
| 6,505,719 B2 * | 1/2003 | Gonzalez | B62K 25/08 188/319.2 |
| 6,592,136 B2 * | 7/2003 | Becker | B62K 25/08 188/282.1 |
| 6,802,407 B1 * | 10/2004 | Chen | B62K 25/08 188/282.8 |

(Continued)

*Primary Examiner* — Thomas J Williams
*Assistant Examiner* — Mariano Sy
(74) *Attorney, Agent, or Firm* — Zimmerman Intellectual Property Services LLC

(57) ABSTRACT

A system/assembly for a suspension fork for a bicycle is disclosed. A suspension system for use in a vehicle is also disclosed. A front suspension fork for a bicycle such as a mountain bike configured to contain a hydraulic fluid for fluid flow and in a flow path providing for compression damping and for rebound damping is also disclosed. A damper assembly configured to contain a hydraulic fluid for fluid flow in a flow path is also disclosed. The assembly/system generally comprises a set of inventive concepts/inventions (combination of inventive features) including (but not specifically limited to): (1) an externally-accessible adjustment mechanism; and (2) internal floating piston. The compression assembly/system of the suspension fork comprises a combination of improved functional assemblies including (but not limited to) an adjustment mechanism (e.g. with a "travel-adjust" setting) operating through flow control elements; the compression assembly can be adjusted to a "travel adjust" setting (with a reduced stroke length) and either of a "neutral" setting or "descend" setting with progressively less resistance in the fluid flow circuit. The rebound assembly/system of the suspension fork comprises a combination of improved functional assemblies including (but not limited to) an adjustment mechanism; the rebound assembly can be adjusted in a range between a "quick" setting and a "slow" setting (corresponding to relative system response speed in rebound to restore stroke length) operating through flow control elements.

33 Claims, 23 Drawing Sheets

(51) Int. Cl.
  *F16F 9/49* (2006.01)
  *B60G 17/08* (2006.01)
  *B60G 15/06* (2006.01)
  *B60G 15/12* (2006.01)
  *B62K 25/04* (2006.01)

(52) U.S. Cl.
  CPC ............... *F16F 9/446* (2013.01); *F16F 9/49* (2013.01); *B60G 2202/12* (2013.01); *B60G 2202/30* (2013.01); *B60G 2300/12* (2013.01); *B60G 2500/10* (2013.01); *B62K 2025/044* (2013.01)

(58) Field of Classification Search
  CPC ............ B60G 2202/12; B60G 2202/30; B60G 2300/12; B60G 2500/10; F16F 9/446; F16F 9/49
  USPC ............ 188/266, 281, 297; 267/221, 64.26; 280/276
  See application file for complete search history.

(56) References Cited

U.S. PATENT DOCUMENTS

| | | | |
|---|---|---|---|
| 7,722,069 B2* | 5/2010 | Shirai | B62K 25/08 188/282.2 |
| 8,181,979 B2* | 5/2012 | Achenbach | B62K 25/08 188/275 |
| 2009/0001684 A1* | 1/2009 | McAndrews | B62K 25/08 280/276 |
| 2011/0121525 A1* | 5/2011 | Shirai | B62K 25/08 280/5.515 |
| 2011/0181009 A1* | 7/2011 | Lude | B62K 25/08 280/65 |
| 2012/0068436 A1* | 3/2012 | Powell | B62K 25/08 280/283 |
| 2015/0054253 A1* | 2/2015 | Pye | B62K 25/08 280/276 |
| 2015/0284048 A1* | 10/2015 | Barefoot | F16F 9/00 267/64.26 |

* cited by examiner

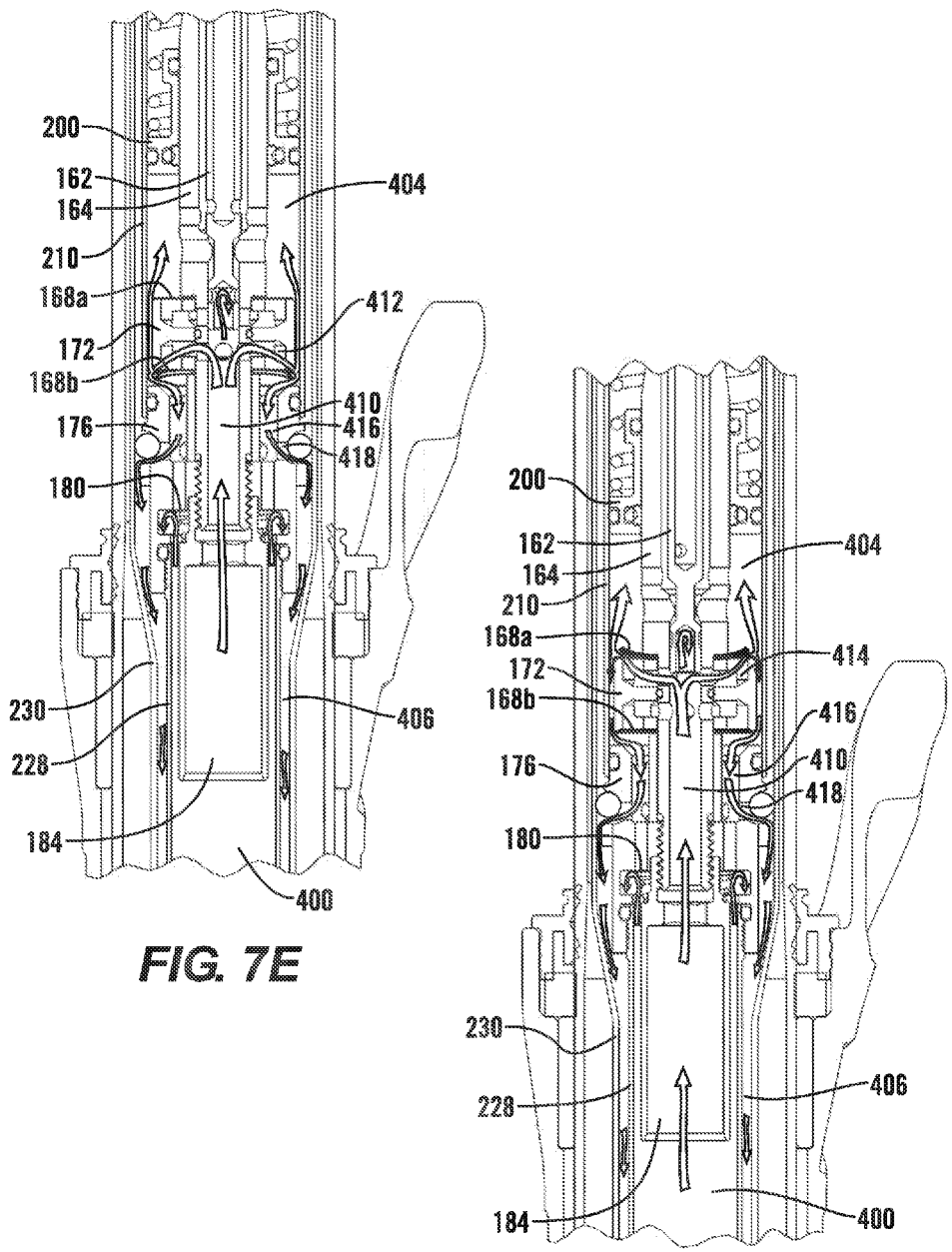

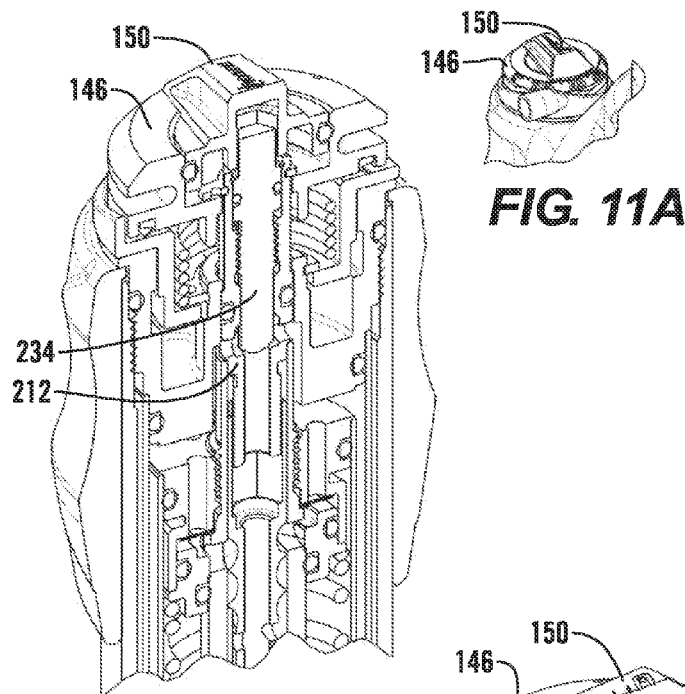
FIG. 11A
FIG. 12A
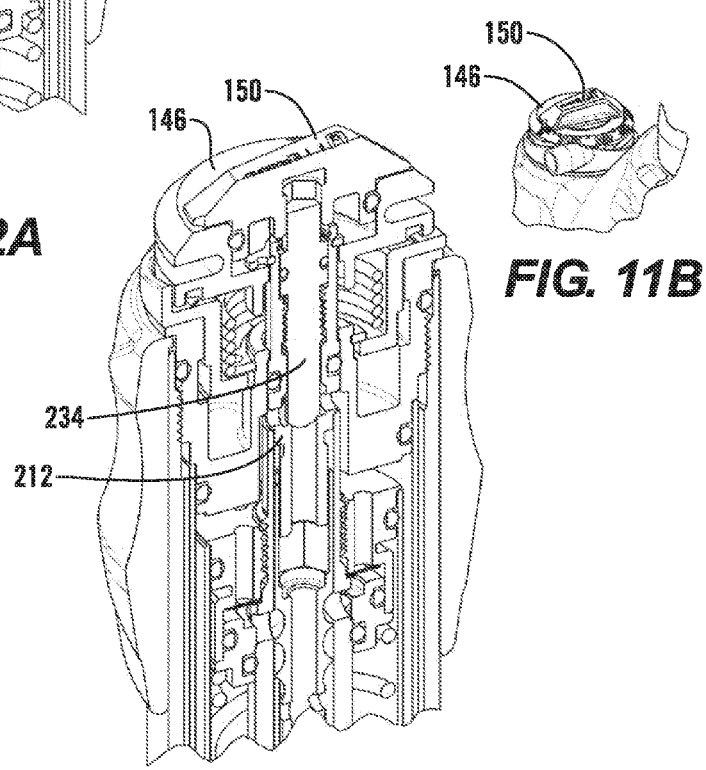
FIG. 11B
FIG. 12B

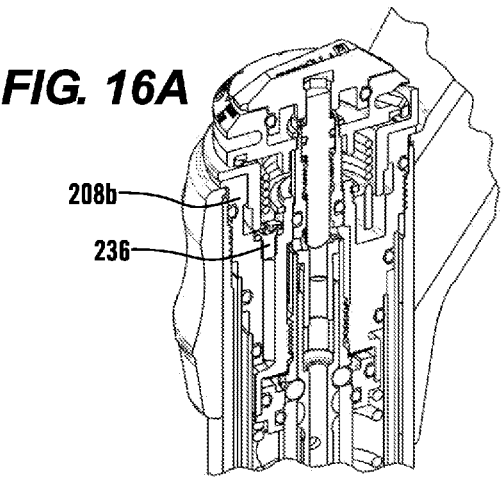
FIG. 16A
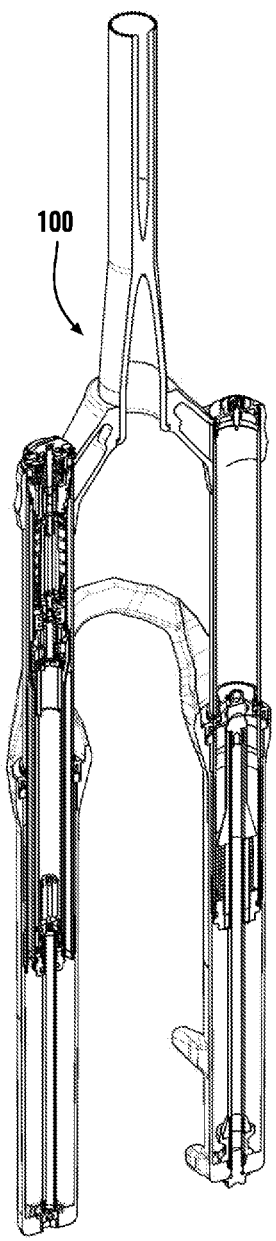
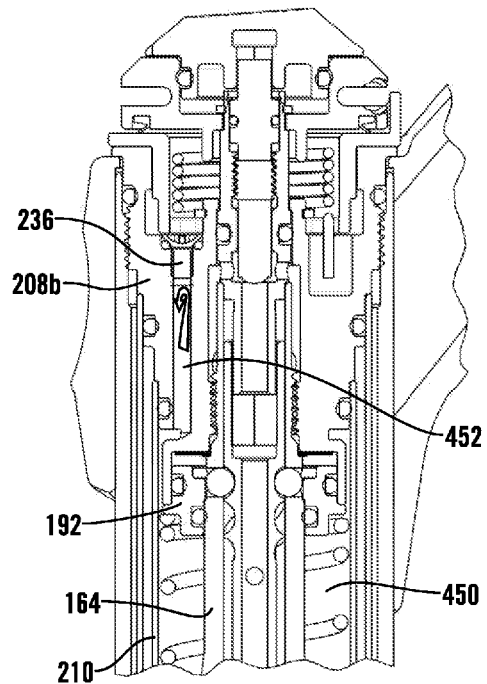
FIG. 16B
FIG. 16

SUSPENSION SYSTEM

CROSS-REFERENCE TO RELATED APPLICATION

The present application claims the benefit of priority of U.S. Provisional Application No. 62/021,114 titled "Suspension System" filed on Jul. 5, 2014, which application is incorporated by reference.

FIELD

The present invention relates to a suspension system. The present invention also relates to a front suspension fork. The present invention further relates to a front suspension fork for a bicycle such as a mountain bike. The present invention further relates to a compression assembly of the suspension fork. The present invention further relates to a rebound assembly of the suspension fork.

BACKGROUND

Bicycling may comprise a variety of riding styles and involve engagement with a variety of different types of courses and terrain. It is known to provide a front suspension fork for a bicycle such as a mountain bike. Certain riding styles may present different forces on the rider and bicycle (as well as a heightened level of voluntary risk and possibly of serious injury taken on by the rider). Certain riders may select and use a front suspension fork for their bicycle based on the appropriate anticipated riding style. Bicycling on a trail or road may result in hitting obstacles such as curbs, rocks, trees, roots, holes or similar obstacles in a manner that puts forces on a fork (including in some circumstances forces that a fork may not be designed to absorb).

A front suspension fork for a bicycle such as a mountain bike may comprise a spring and damper. According to a known arrangement the suspension fork has a central steerer tube that is coupled to the bike frame and two legs with an axle for the front wheel of the bike. In a typical arrangement, a spring assembly is housed in one leg or tube of the fork and a damper assembly is housed in the other leg of the fork.

It is known to provide a front suspension fork with a damper assembly that comprises a rebound damper assembly or mechanism and a compression damper assembly or mechanism. The compression assembly operates to absorb impact (compressing/shortening the fork length); the rebound assembly operates to dampen the return after impact (as the fork returns to its operating length). (When a front suspension fork is compressed to at or near full compression, the fork is said to "bottom-out".)

Riders (particularly advanced riders) may seek to improve the quality of their riding/ride by making adjustments of the components of their bicycle, including adjustments of the damper assembly (e.g. compression assembly and/or rebound assembly) of the front suspension fork of their bicycle.

It would be advantageous to provide a suspension fork with an improved configuration for a compression assembly and/or an improved configuration for a rebound assembly. It would also be advantageous to provide a front suspension fork for a bicycle with an improved configuration for the compression assembly that could be adjusted (e.g. conveniently) to provide desired performance characteristics. It would further be advantageous to provide a front suspension fork for a bicycle with an improved configuration for the rebound assembly to provide desired performance characteristics. It would be further advantageous to provide a front suspension fork for a bicycle that could be adjusted to modify the travel.

SUMMARY

Accordingly, it would be advantageous to provide an improved a suspension system. It would also be advantageous to provide an improved front suspension fork for a bicycle such as a mountain bike.

The present invention relates to a suspension system for use in a vehicle. The system comprises a damper assembly comprising an internal floating piston assembly configured to operate within a length of travel and an adjustment mechanism configured to provide a first setting and a second setting for the damper assembly. The first setting the length of travel is reduced.

The present invention also relates to a front suspension fork for a bicycle such as a mountain bike configured to contain a hydraulic fluid for fluid flow and in a flow path providing for compression damping and for rebound damping. The fork comprises a compression system providing a compression stroke distance defining travel; a rebound system; a first adjustment mechanism configured to modify compression damping and to modify travel; and a second adjustment mechanism configured to modify rebound damping. Modifying travel reduces the compression stroke distance. The compression system is configured to operate at a plurality of settings.

The present invention also relates to a damper assembly configured to contain a hydraulic fluid for fluid flow in a flow path. The assembly comprises a compression assembly comprising a piston assembly; a rebound assembly; a first adjuster configured to adjust settings for the compression assembly; and a second adjuster configured to adjust settings for the rebound assembly. Settings for the compression assembly modify compression damping characteristics and travel. Settings for the rebound assembly modify rebound damping characteristics.

FIGURES

FIG. 7E is a schematic fragmentary cut-away cross-section view of an assembly of a suspension fork according to an exemplary embodiment.

FIG. 7F is a schematic fragmentary cut-away cross-section view of an assembly of a suspension fork according to an exemplary embodiment.

FIG. 11A is a schematic fragmentary cut-away perspective view of an assembly of a suspension fork according to an exemplary embodiment.

FIG. 11B is a schematic fragmentary cut-away perspective view of an assembly of a suspension fork according to an exemplary embodiment.

FIG. 12A is a schematic fragmentary cut-away perspective view of an assembly of a suspension fork according to an exemplary embodiment.

FIG. 12B is a schematic fragmentary cut-away perspective view of an assembly of a suspension fork according to an exemplary embodiment.

FIG. 16 is a schematic cut-away perspective view of a suspension fork for a bicycle according to an alternative embodiment.

FIG. 16A is a schematic fragmentary cut-away perspective view of an assembly of the suspension fork of FIG. 16.

FIG. 16B is a schematic fragmentary cut-away perspective view of an assembly of the suspension fork of FIG. 16.

DESCRIPTION

Figure 1:
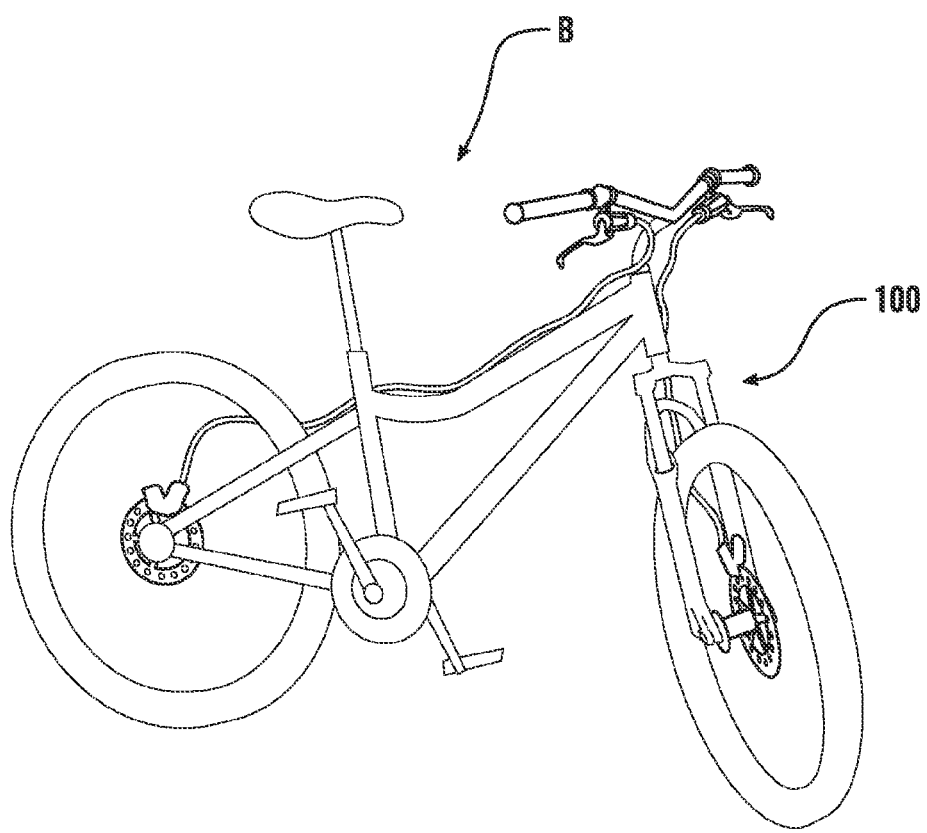
FIG. 1 is a schematic perspective view of a bicycle with a suspension fork according to an exemplary embodiment.
Figure 2:
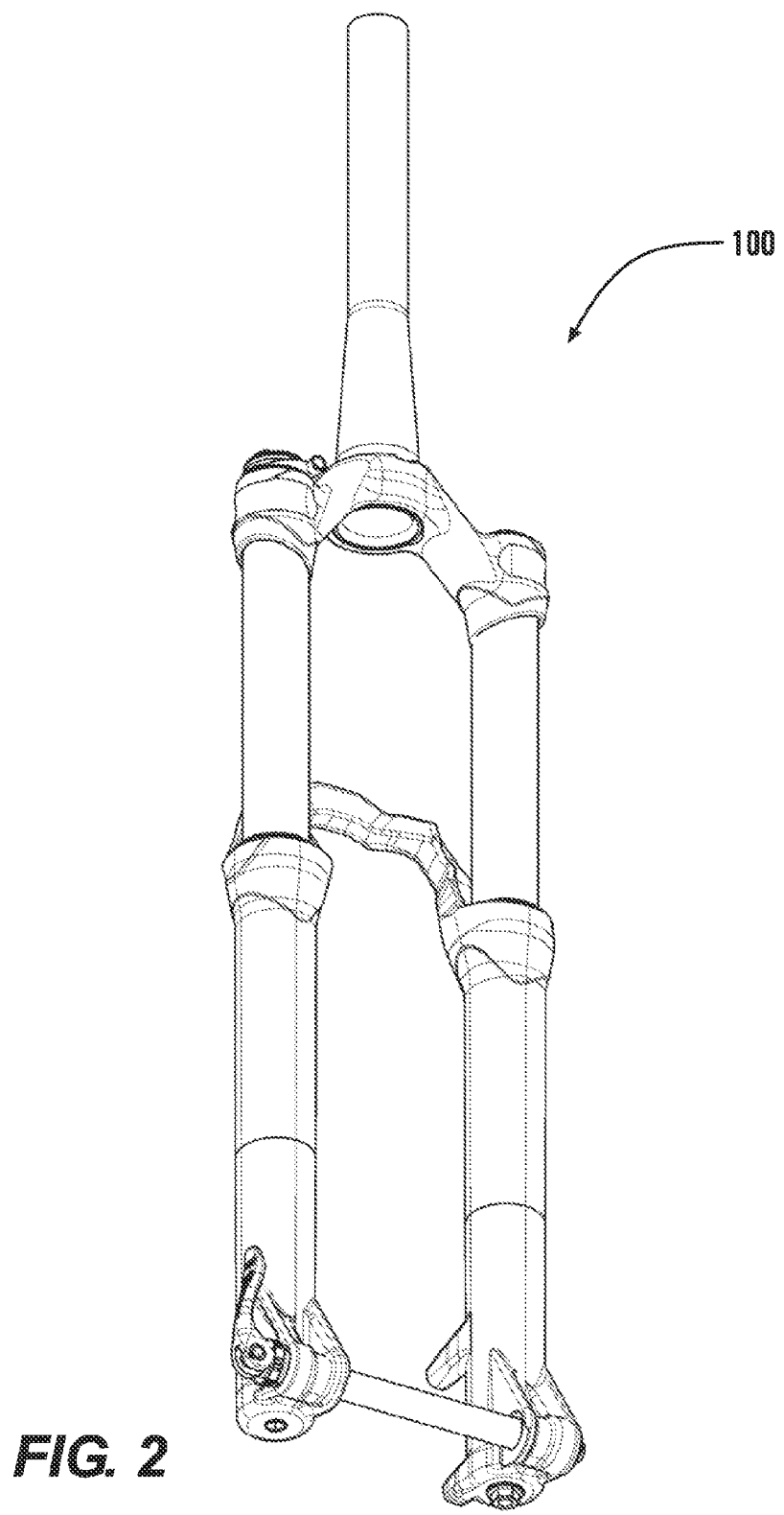
FIG. 2 is a schematic perspective view of a suspension fork for a bicycle according to an exemplary embodiment.

Referring to FIG. 1 Referring to FIGS. 1 and 2, a mountain bicycle with a front suspension fork is shown according to an exemplary embodiment.

Figure 3:
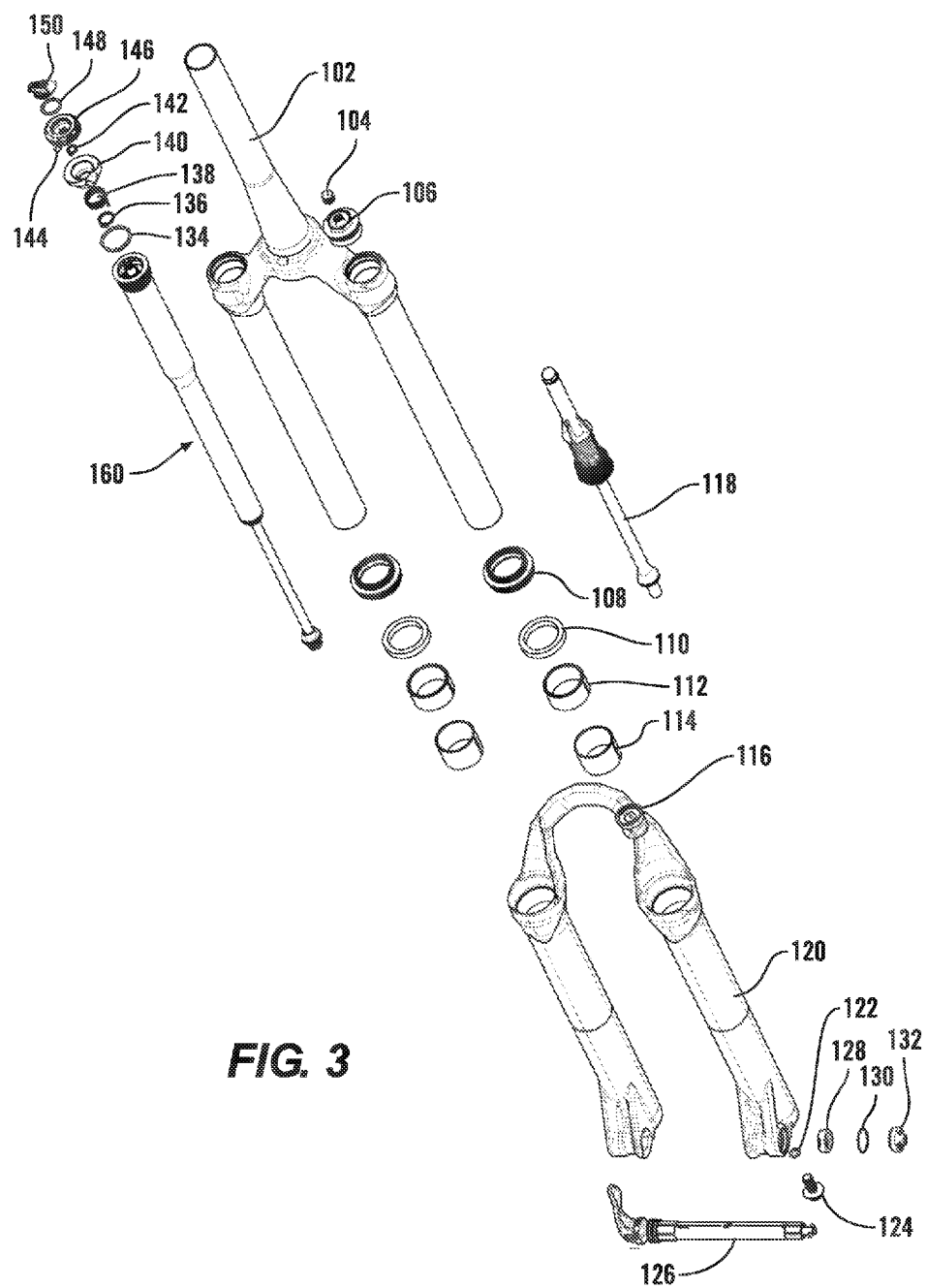
FIG. 3 is a schematic exploded perspective view of a suspension fork according to an exemplary embodiment.
Figure 4:
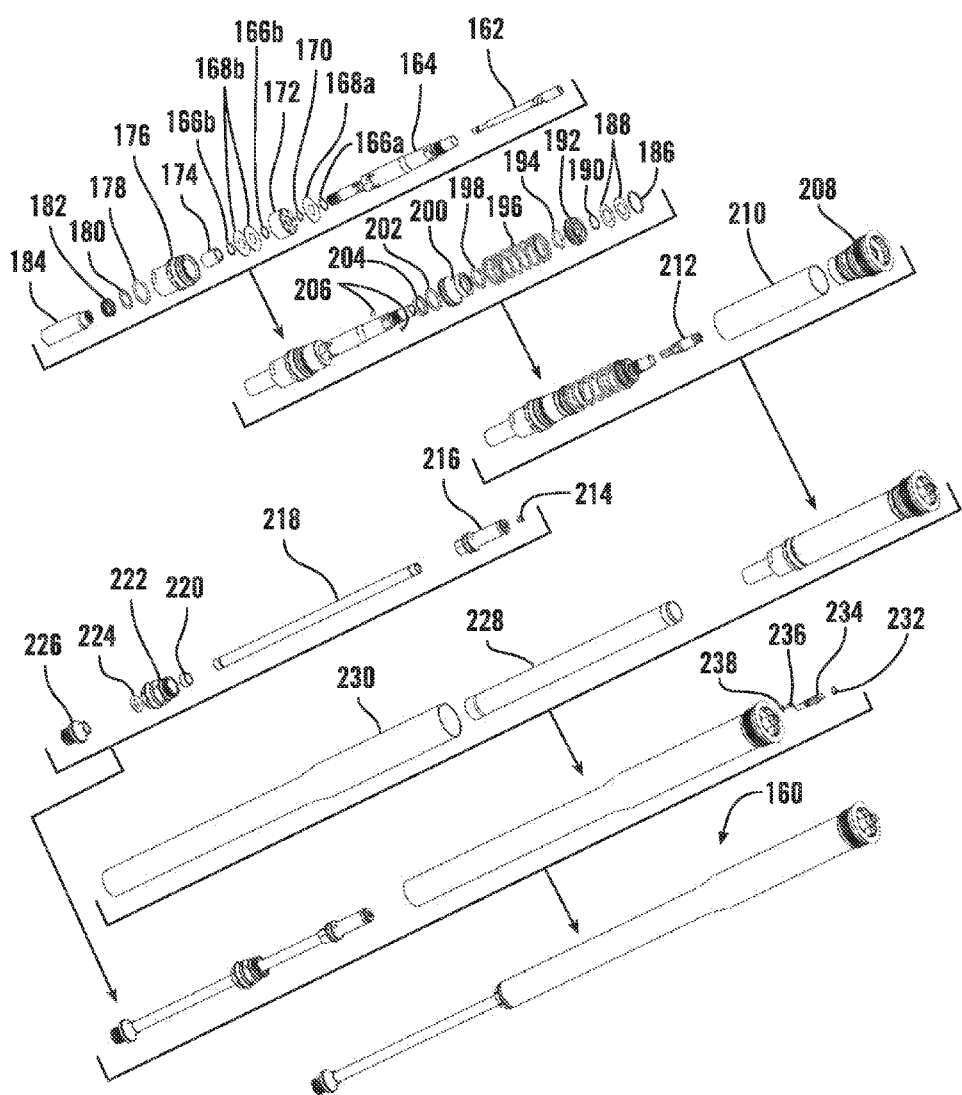
FIG. 4 is a schematic exploded perspective view of the assembly of a suspension fork according to an exemplary embodiment.
Figure 4A:
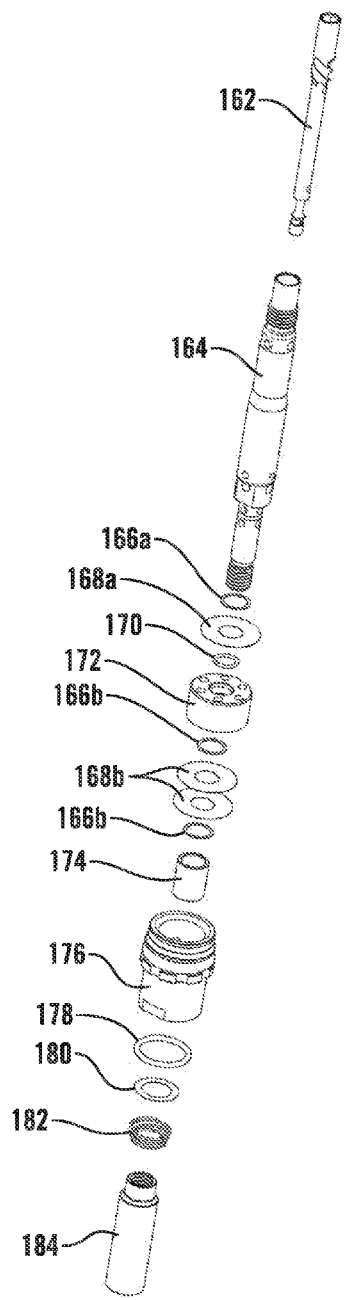
FIG. 4A is a schematic fragmentary exploded perspective view of the assembly of a suspension fork according to an exemplary embodiment.
Figure 4B:
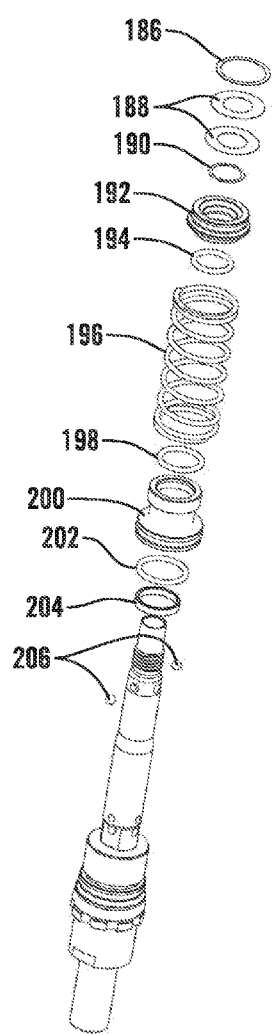
FIG. 4B is a schematic fragmentary exploded perspective view of the assembly of a suspension fork according to an exemplary embodiment.
Figure 4C:
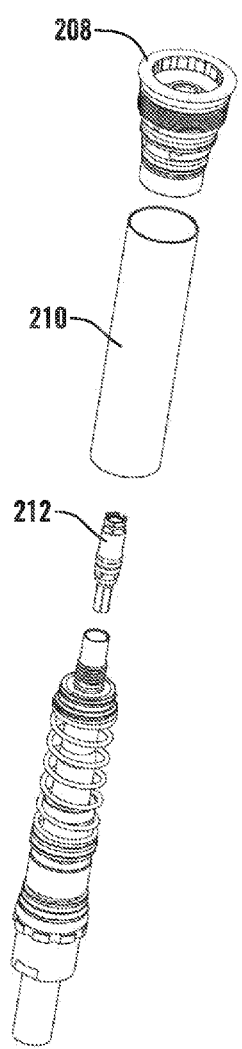
FIG. 4C is a schematic fragmentary exploded perspective view of the assembly of a suspension fork according to an exemplary embodiment.

Referring to FIGS. 2, 3 and 4 a suspension system shown as a front suspension fork for a bicycle such as a mountain bike is shown according to an exemplary embodiment. The front suspension fork comprises a spring assembly and damper assembly. As shown in FIGS. 1-2, the front suspension fork has a central steerer tube that is coupled to the bike frame and two legs with an axle for the front wheel of the bike. As indicated in FIGS. 2-3, a spring assembly is housed in one leg or tube of the fork and a damper assembly is housed in the other leg or tube of the fork.

FIGS. 4 and 4A to 4C show in exploded view a front suspension fork (for a bicycle) according to an exemplary embodiment with a compression assembly or system and a rebound assembly or system.

According to an exemplary embodiment, the front suspension fork comprises a damper assembly/system with a compression assembly (see e.g. FIGS. 6-7 and 6A, 6B and 7A) and a rebound assembly (see e.g. FIGS. 6-7 and 9A, 9B, 10A and 10B).

The compression assembly operates to absorb impact in compression (compressing/shortening the fork length); the rebound assembly dampens the return after impact (as the fork extends towards its full length).

Figure 13A:
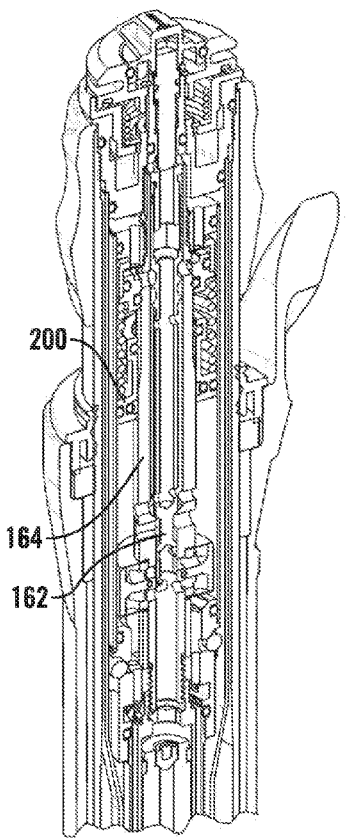
FIG. 13A is a schematic fragmentary cut-away perspective view of an assembly of a suspension fork according to an exemplary embodiment.
Figure 13B:
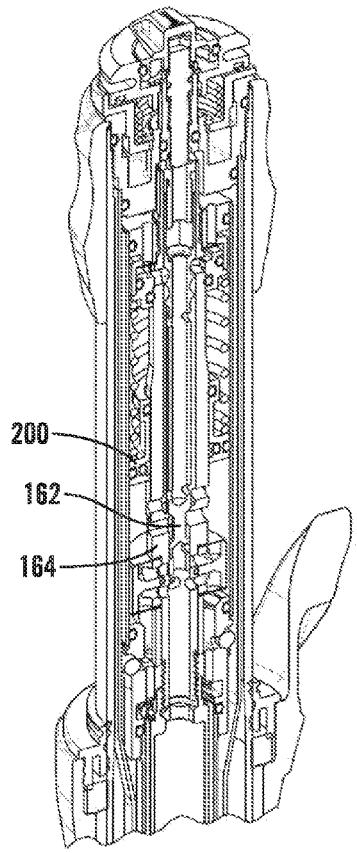
FIG. 13B is a schematic fragmentary cut-away perspective view of an assembly of a suspension fork according to an exemplary embodiment.
Figure 13C:
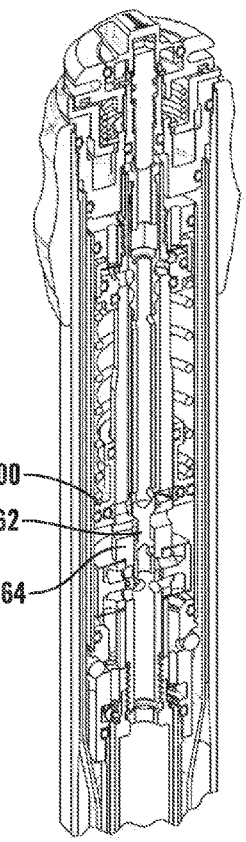
FIG. 13C is a schematic fragmentary cut-away perspective view of an assembly of a suspension fork according to an exemplary embodiment.
Figure 13D:
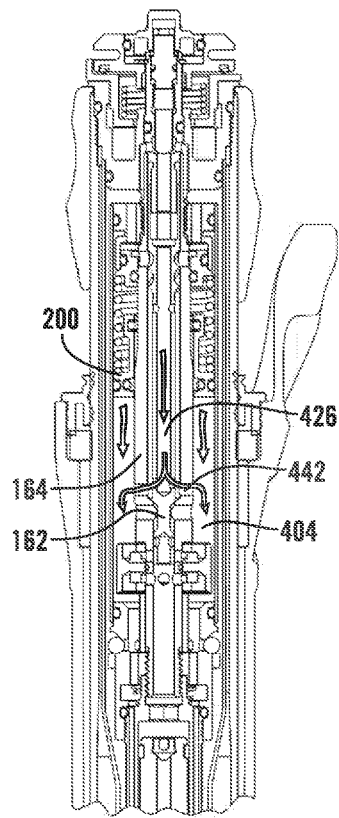
FIG. 13D is a schematic fragmentary cut-away cross-section view of an assembly of a suspension fork according to an exemplary embodiment.
Figure 13E:
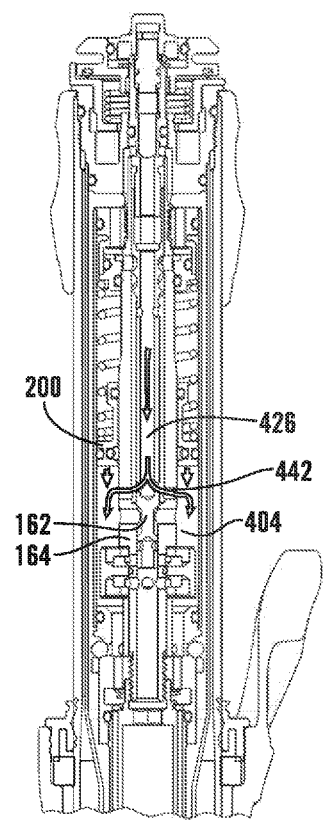
FIG. 13E is a schematic fragmentary cut-away cross-section view of an assembly of a suspension fork according to an exemplary embodiment.
Figure 13F:
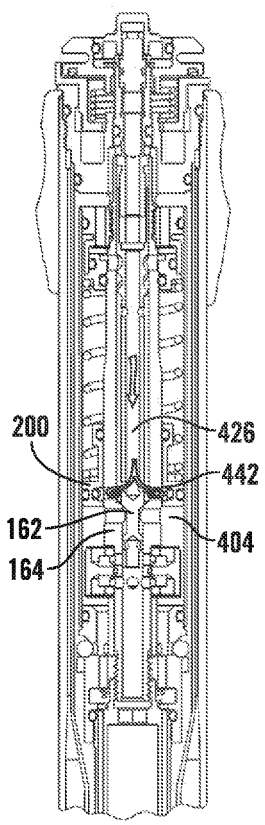
FIG. 13F is a schematic fragmentary cut-away cross-section view of an assembly of a suspension fork according to an exemplary embodiment.

According to an exemplary embodiment shown schematically in the FIGURES: the compression assembly or system operates at three distinct settings for performance adjustment of relative compression response (responsiveness under compressive force/load) for the system: (1) a "travel adjust" mechanism/setting (t) for the system and (2) a "neutral" setting (n) and (3) a "descend" setting (d), and the rebound assembly or system operates within a variable range of settings for performance adjustments for relative speed of rebound response (restoration of stroke length) for the system between: (1) a quicker rebound setting (q) and (2) a slower rebound setting (s). (Where applicable, indication of a particular system setting may be provided with a FIGURE number in the specification showing the system at the particular setting; for example reference to "FIG. 11A(q)" indicates that the system as shown in FIG. 11A is at the "quicker rebound" setting (q); reference to "FIG. 13H(t)" indicates that the system as shown in FIG. 13H is at the "travel adjust" setting (t).)

The configuration of settings for the compression assembly and/or rebound assembly determine (e.g. by configuration/positioning of flow control elements/restrictions) the flow path/flow rate of contained fluid (e.g. hydraulic fluid) in the suspension fork and corresponding performance/response characteristics experienced through the system by the rider. See FIGS. 17-19. According to alternative embodiments, the system may also comprise an air spring arrangement. Compare FIGS. 15 and 16.

Assembly/System

The parts/components of the compression assembly/system are shown generally in FIGS. 4 and 4A to 4C. Adjustment of the compression system is shown generally in FIGS. 6-7, 8, 8A(t), 8B(n) and 8C(d). The operation of the compression system is shown generally in FIGS. 5A, 5B, 5C, 6A, 6B, 7A, 7E(t), 7F(n) and 7G(d).

The parts/components of the rebound assembly/system are shown generally in FIGS. 4 and 4A to 4C. Adjustment of the rebound system is shown generally in FIGS. 11A(q), 11B(s), 12A(q), 12B(s), 12C(q) and 10D(s). The operation of the rebound system is shown generally in FIGS. 9A, 9B, 10A, 10B and 13D, 13E, 13F, 13G(t), 13H(t), 13I(t), 14A (n/d), 14B(n/d), 14C(n/d).

The parts and components of the systems shown in the FIGURES are identified by reference numeral in TABLE A and TABLE B. (Reference numerals appearing in the FIGURES may include an indicator "a" and "b" in association with the reference numeral as identifying the part or component in the TABLES.)

TABLE A

| REFERENCE NUMERAL | PART/COMPONENT |
|---|---|
| B | bicycle |
| 100 | fork assembly |
| 102 | crown steer assembly |
| 104 | air cap |
| 106 | top cap |
| 108 | seal |
| 110 | foam ring |
| 112 | upper bushing |
| 114 | lower bushing |
| 116 | air piston |
| 118 | compression rod assembly |
| 120 | casting |
| 122 | seal |
| 124 | fastener |
| 126 | axle assembly |
| 128 | seat |
| 130 | seal |
| 132 | cap |
| 134 | seal |
| 136 | retaining ring |
| 138 | torsion spring |
| 140 | cable stop |
| 142 | retaining ring |
| 144 | set screw |
| 146 | compression knob |
| 148 | o-ring |
| 150 | rebound knob |
| 160 | damper cartridge assembly |
| 162 | compression needle |
| 164 | compression shaft |
| 166 | shim |
| 168 | shim |
| 170 | o-ring |
| 172 | compression piston |
| 174 | spacer |
| 176 | piston adapter |
| 178 | o-ring |
| 180 | shim |
| 182 | spring |
| 184 | hydraulic bottom out cup |
| 186 | shim |
| 188 | shim |
| 186a and 188a | first shim stack |
| 186b and 188b | second shim stack |
| 190 | shim |
| 192 | rebound piston |
| 194 | o-ring |
| 196 | spring |
| 198 | o-ring |
| 200 | internal floating piston (IFP) |
| 202 | o-ring |
| 204 | piston ring |
| 206 | ball |
| 208 | top cap |
| 210 | tube |
| 212 | compression adjuster |
| 214 | set screw |
| 216 | hydraulic bottom out piston |

TABLE A-continued

| REFERENCE NUMERAL | PART/COMPONENT |
|---|---|
| 218 | shaft |
| 220 | ring |
| 222 | end cap |
| 224 | o-ring |
| 226 | casting adapter |
| 228 | tube |
| 230 | outer tube |
| 232 | retaining ring |
| 234 | rebound needle |
| 236 | screw |
| 238 | o-ring |

TABLE B

| REFERENCE NUMERAL | CHAMBER/PASSAGE IN PART/COMPONENT |
|---|---|
| 400 | upper chamber<br>related parts/elements:<br>hydraulic bottom out piston (216)<br>tube (228)<br>hydraulic bottom out cup (184)<br>piston adapter (176) |
| 402 | lower chamber<br>related parts/elements:<br>hydraulic bottom out piston (216)<br>shaft (218)<br>end cap (222)<br>tube (228) |
| 404 | IFP chamber<br>related parts/elements:<br>internal floating piston (IFP) (200)<br>compression shaft (164)<br>tube (228)<br>compression piston (172)<br>piston adapter (176)<br>shim (180) |
| 406 | lower sleeve passage<br>related parts/elements:<br>tube (228)<br>outer tube (230) |
| 408 | orifice<br>related parts/elements:<br>end cap (222) |
| 410 | lower central passage<br>related parts/elements:<br>compression shaft (164) |
| 412 | lower compression piston passage<br>related parts/elements:<br>compression piston (172) |
| 414 | upper compression piston passage<br>related parts/elements:<br>compression piston (172) |
| 416 | passage<br>related parts/elements:<br>piston adapter (176) |
| 418 | radial check valve orifice<br>related parts/elements:<br>piston adapter (176) |
| 420 | lower compression needle orifice<br>related parts/elements:<br>compression needle (162) |
| 422 | lower compression shaft orifice<br>related parts/elements:<br>compression shaft (164) |
| 424 | upper sleeve passage<br>related parts/elements:<br>tube (210)<br>outer tube (230) |
| 424 | upper sleeve passage<br>related parts/elements:<br>tube (210)<br>outer tube (230) |

TABLE B-continued

| REFERENCE NUMERAL | CHAMBER/PASSAGE IN PART/COMPONENT |
|---|---|
| 426 | upper central passage<br>related parts/elements:<br>compression needle (162) |
| 428 | passage<br>related parts/elements:<br>top cap (208) |
| 430 | orifice<br>related parts/elements:<br>compression shaft (164) |
| 432 | helical passage<br>related parts/elements:<br>compression needle (162)<br>compression shaft (164) |
| 434 | orifice<br>related parts/elements:<br>compression needle (162) |
| 436 | passage<br>related parts/elements:<br>top cap (208)<br>compression shaft (164) |
| 438 | rebound needle passage<br>related parts/elements:<br>rebound needle (234)<br>compression adjuster (212) |
| 440 | upper compression needle orifice<br>related parts/elements:<br>compression needle (162) |
| 442 | upper compression shaft orifice<br>related parts/elements:<br>compression shaft (164) |
| 450 | IFP air chamber<br>related parts/elements:<br>compression shaft (164)<br>tube (210)<br>internal floating piston (IFP) (200)<br>rebound piston (192)<br>top cap (208) |

Assembly/System Adjustment/Settings

Figure 8A:
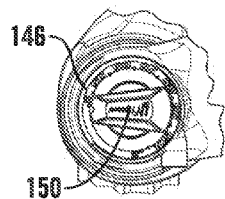
FIG. 8A is a fragmentary plan view of an assembly of a suspension fork according to an exemplary embodiment.
Figure 8B:
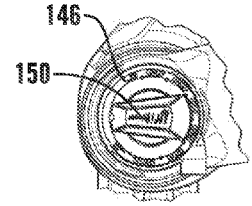
FIG. 8B is a fragmentary plan view of an assembly of a suspension fork according to an exemplary embodiment.
Figure 8C:
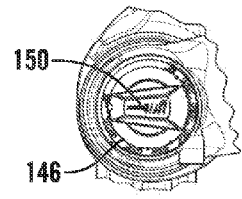
FIG. 8C is a fragmentary plan view of an assembly of a suspension fork according to an exemplary embodiment.
Figure 8:
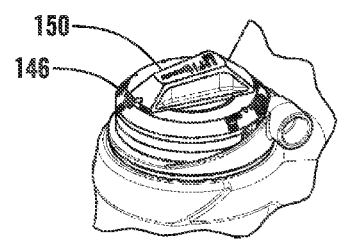
FIG. 8 is a schematic fragmentary cut-away perspective view of an assembly of a suspension fork according to an exemplary embodiment.

As shown in FIG. 8, the compression system is provided with an externally-accessible adjustment mechanism that comprises a knob located (conveniently for access) at the top of the leg. According to an exemplary embodiment, the adjustment mechanism provides a knob that can be rotated to each of three distinct settings: (1) "travel-adjust" setting (t); (2) "intermediate/neutral" setting (n); (3) "descend" setting (d). See corresponding FIGS. 8A(t), 8B(n) and 8C(d).

Rotation of the adjuster knob 146 rotates a compression adjuster 212 through a keyed interface which rotates the compression needle 162 through a keyed interface and axially translates compression needle 162 within a compression shaft 164; translation is driven through a ball 206 (or balls) engaged within spiral grooves of compression needle 162 and corresponding pockets in the compression shaft 164. The compression needle 162 translates as the adjustment mechanism is rotated to a setting (e.g. each setting maintained by detents in the mechanism/knob).

Figure 7:
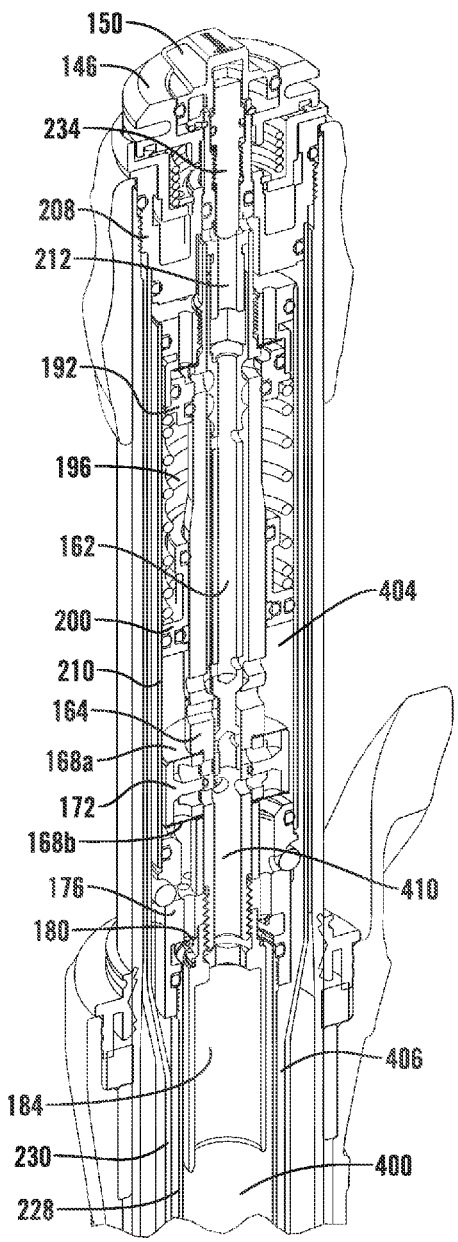
FIG. 7 is a schematic fragmentary cut-away perspective view of an assembly of a suspension fork according to an exemplary embodiment.

As shown in FIGS. 8A(t), 8B(n) and 8C(d), the adjustment mechanism allows the compression mechanism to be adjusted between three distinct settings of relative fluid flow restriction. As indicated, in the "travel adjust" setting (t) an internal floating piston 200 on compression shaft 164 is positioned (by compression or expansion of spring 196 and fluid pressure) to restrict flow of fluid through the compression needle 162 adjacent the bottom-out cup 184 and restricts travel (e.g. length) of the stroke which has the effect of (among other things) enhancing system responsiveness. See FIGS. 7E(t) and 13G(t), 13H(t) and 13I(t) and 19. As indicated, the relative degree of fluid restriction at the compression needle 162 is greater in the neutral setting (n) than in the descend setting (d). Compare FIGS. 7F(n) and 7G(d).

Figure 13G:
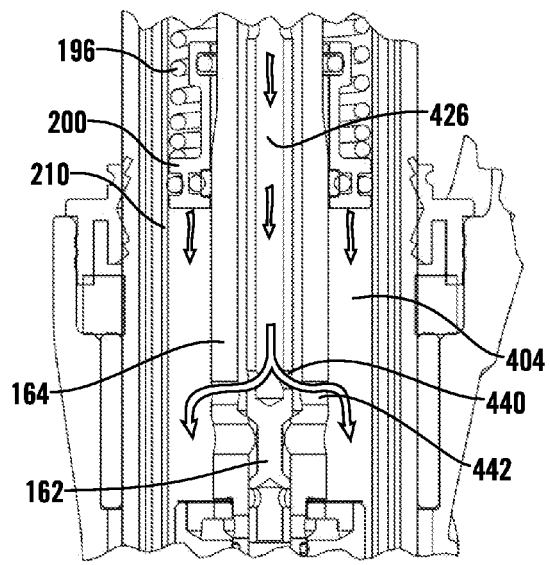
FIG. 13G is a schematic fragmentary cut-away cross-section view of an assembly of a suspension fork according to an exemplary embodiment.
Figure 13H:
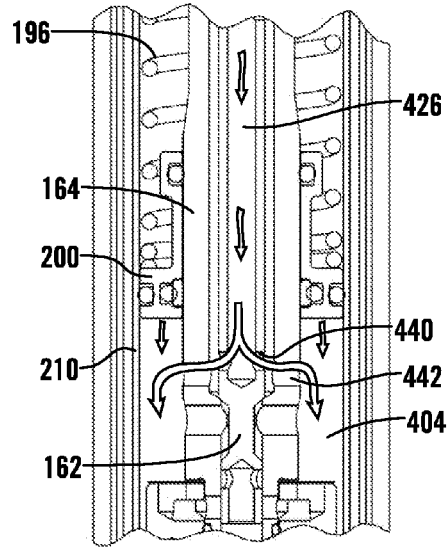
FIG. 13H is a schematic fragmentary cut-away cross-section view of an assembly of a suspension fork according to an exemplary embodiment.
Figure 14A:
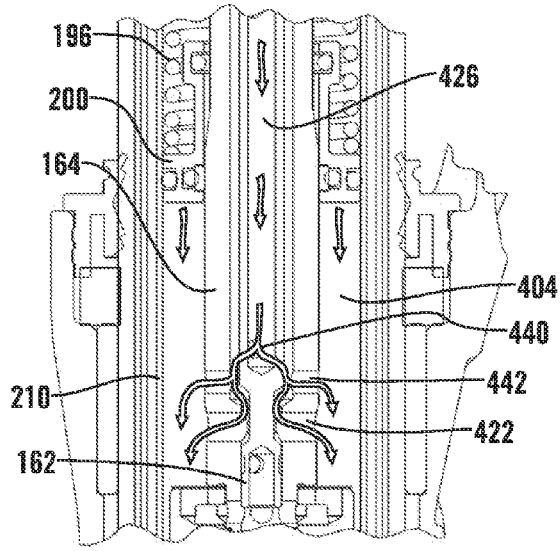
FIG. 14A is a schematic fragmentary cut-away cross-section view of an assembly of a suspension fork according to an exemplary embodiment.
Figure 14B:
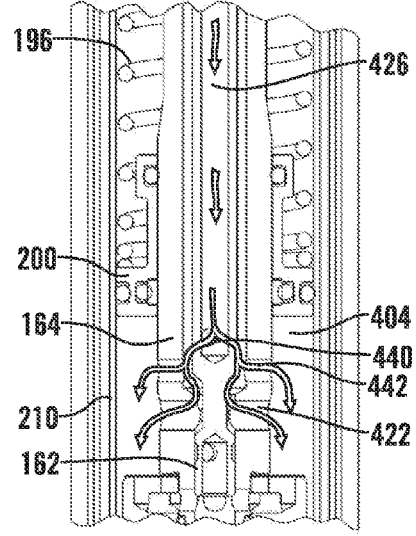
FIG. 14B is a schematic fragmentary cut-away cross-section view of an assembly of a suspension fork according to an exemplary embodiment.

As further indicated schematically in FIGS. 13G(t), 13H (t), 13I(t) and FIGS. 14A(n/d), 14B(n/d), 14C(n/d), the setting of the compression mechanism will determine the flow characteristics and therefore the response of the compression assembly (system).

"Travel-Adjust" Setting (t)

Figure 7A:
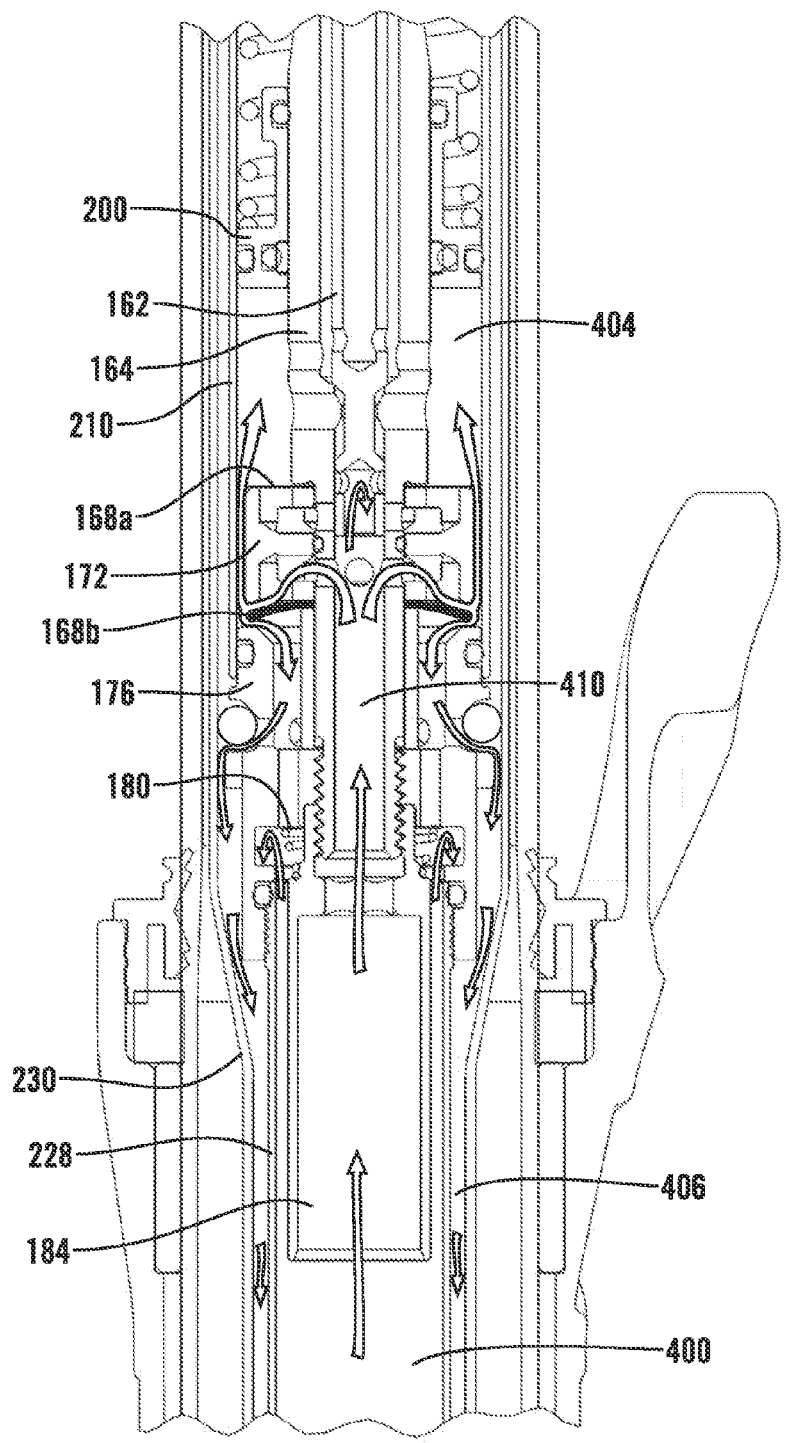
FIG. 7A is a schematic fragmentary cut-away cross-section view of an assembly of a suspension fork according to an exemplary embodiment.
Figure 7B:
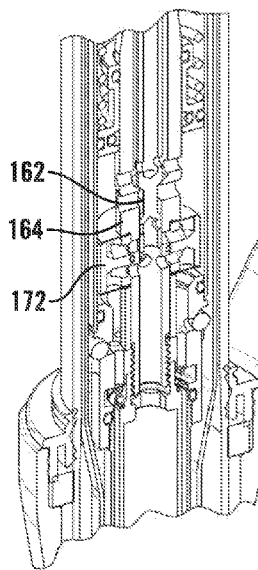
FIG. 7B is a schematic fragmentary cut-away perspective view of an assembly of a suspension fork according to an exemplary embodiment.

The system operation and response in the travel-adjust setting (t) according to an exemplary embodiment, are shown in FIGS. 7B(t), 7E(t), 8A(t), 11G(t), 13H(t), 13I(t).

"Neutral/Intermediate" Setting (n)

Figure 7C:
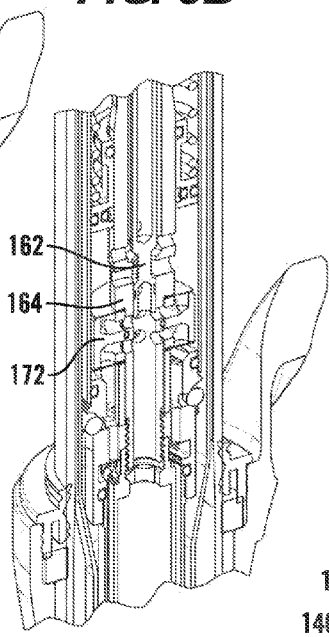
FIG. 7C is a schematic fragmentary cut-away perspective view of an assembly of a suspension fork according to an exemplary embodiment.

The system operation and response in the neutral/intermediate setting (n) according to an exemplary embodiment, are shown in FIGS. 7C(n), 7F(n), 8B(n), 14A(n/d), 14B(n/d) and 14C(n/d).

"Descend" Setting (d)

Figure 7D:
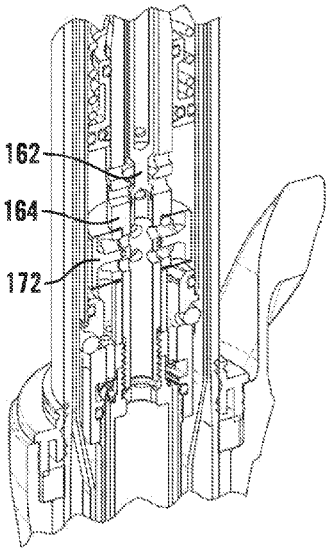
FIG. 7D is a schematic fragmentary cut-away perspective view of an assembly of a suspension fork according to an exemplary embodiment.

The system operation and response in the descend setting (d) according to an exemplary embodiment, are shown in FIGS. 7D(d), 7G(d), 8C(d), 14A(n/d), 14B(n/d) and 14C(n/d).

The compression system employs a set of shim stacks each comprising a set of shim springs (having the form of a flange or washer) secured to operate as a flow control element as shown in FIGS. 7A(c), 7E(t), 7F(n) and 7G(d).

As indicated schematically in FIG. 7A, each set of shim stacks functioning with the flow control element for the compression system is installed adjacent an internal floating piston 200 on compression shaft 164 and compression needle 162. See also FIGS. 7E(t), 7F(n) and 7G(d).

Figure 7G:
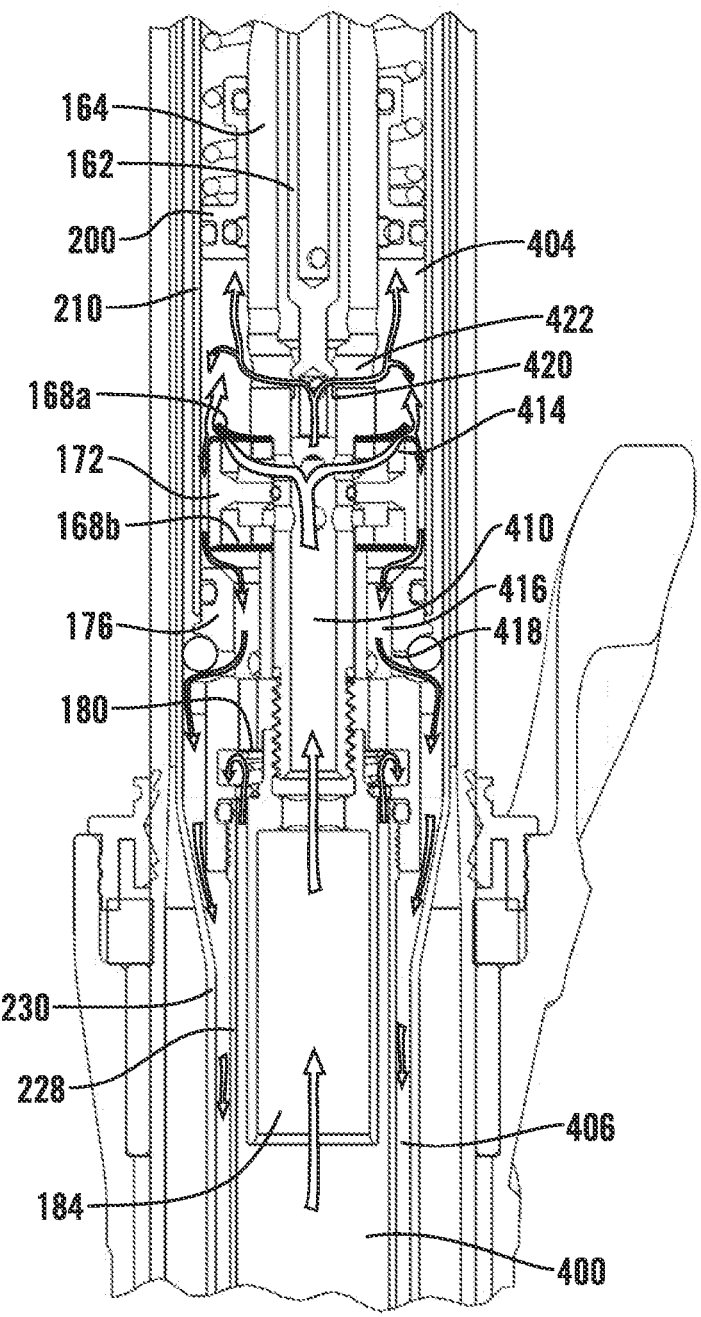
FIG. 7G is a schematic fragmentary cut-away cross-section view of an assembly of a suspension fork according to an exemplary embodiment.

As shown schematically in FIGS. 7 and 7A(c), the adjustment mechanism through a flow control element comprising internal floating piston 200 and compression needle 162 and the shims 166 and 168 (among other components) will determine the flow characteristics and therefore the response of the compression assembly (system). At the travel-adjust setting (t) (see FIG. 7E(t)) the flow of fluid through the flow control element is more substantially restricted (and therefore a greater force is required for flow across the element) as to limit the travel or stroke length of the system. At the neutral setting (n) (see FIG. 7F(n)) the flow of fluid through the flow control element is less restricted (and therefore a lesser force is required for flow across the element). At the descend setting (d) (see FIG. 7G(d)) the flow of fluid through the flow control elements is further less restricted (and therefore a further lesser force is required for flow across the element).

As shown in FIGS. 11A(q)-11B(s), 12A(q)-12B(s) and 12C(q)-12D(s), the rebound system is provided with an externally-accessible adjustment mechanism that comprises an adjustment knob 150 located (conveniently for access) at the top of the leg. According to an exemplary embodiment, the adjustment mechanism provides a knob that can be rotated in a range between the two terminal settings: (1) a "quick" rebound flow setting (q) (shown schematically in FIGS. 11A(q), 12A(q), 12C(q)) and (2) a "slow" rebound flow setting (s) (shown schematically in FIGS. 11B(s), 12B(s), 12D(s)). See also FIG. 18. Rotation of the rebound knob 150 rotates the rebound needle 234 through a keyed interface which axially translates the rebound needle 234 due to a threaded connection with the compression adjuster 212. The rebound needle 234 translates as the adjustment mechanism is rotated to a setting.

Operation/Performance of the System

Figures 5A, 5B, 5C:
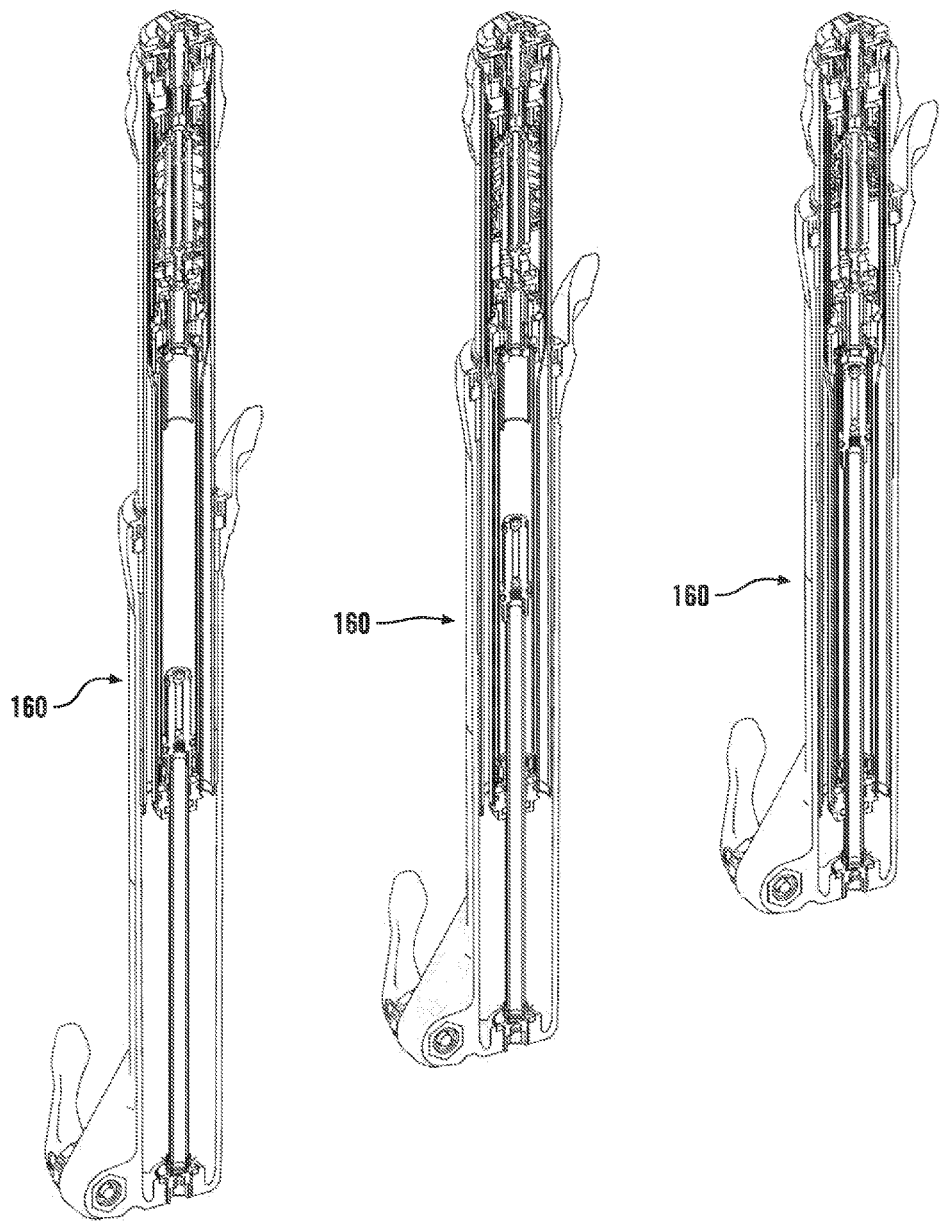
FIG. 5A is a schematic cut-away perspective view of an assembly of a suspension fork according to an exemplary embodiment.
FIG. 5B is a schematic cut-away perspective view of an assembly of a suspension fork according to an exemplary embodiment.
FIG. 5C is a schematic cut-away perspective view of an assembly of a suspension fork indicating engagement of a hydraulic bottom out mechanism according to an exemplary embodiment.
Figure 6:
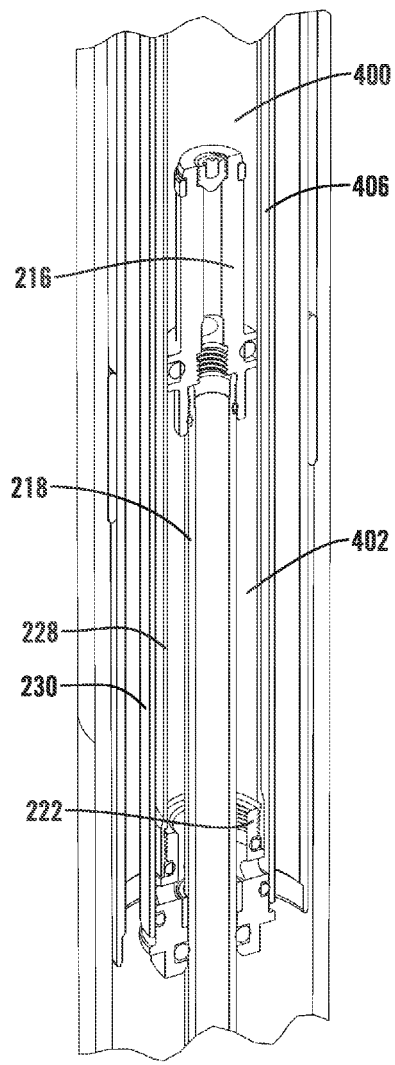
FIG. 6 is a schematic fragmentary cut-away perspective view of an assembly of a suspension fork according to an exemplary embodiment.

Referring to FIGS. 5A and 5B and 5C the assembly is shown schematically in three progressively retracted/compressed stages of operation as would occur during operation/use. Elements of the fluid flow circuit of the assembly are shown generally in FIGS. 6 and 7. FIG. 6 shows the lower portion of the assembly (in pertinent part); FIG. 7 shows the upper portion of the assembly (in pertinent part). The flow circuit of the assembly during compression is shown schematically (in part) in FIGS. 6A and 6B and 7A.

Figure 6A:
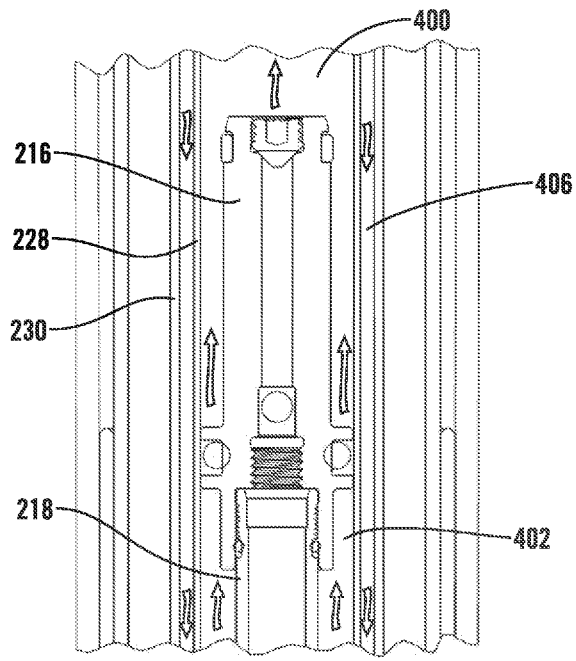
FIG. 6A is a schematic fragmentary cut-away cross-section view of an assembly of a suspension fork according to an exemplary embodiment.
Figure 6B:
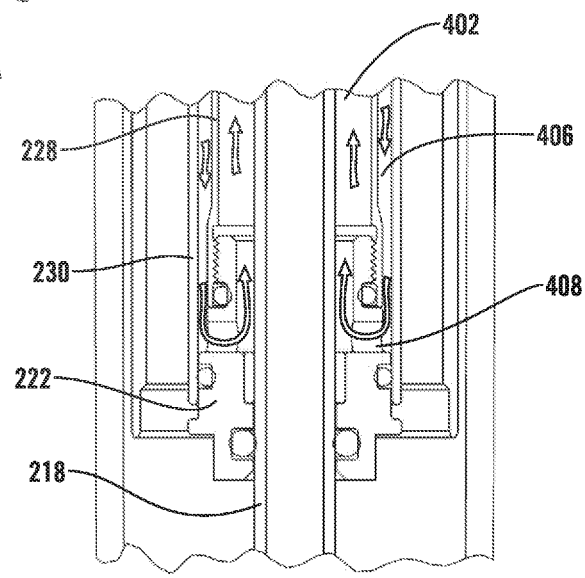
FIG. 6B is a schematic fragmentary cut-away cross-section view of an assembly of a suspension fork according to an exemplary embodiment.

FIGS. 6A and 6B show flow in segments of the lower portion of the assembly; as indicated schematically, flow in a substantially central chamber 400/402 is driven by piston 216 within tube 228 as counter-flow within an annular sleeve passage 406 exterior to tube 228 (interior to tube 230) is supplied to and through a port or orifice 408 at the base (at the end cap 222).

FIG. 7A shows flow in the upper portion of the assembly; as indicated schematically, flow in the chamber 400 (through cup 184) enters a passage 410 (in compression shaft 164) and flows through the flow control element into chamber 404 containing an internal floating piston 200 and is supplied as counter-flow to the annular sleeve passage 406 (between tube 228 and outer tube 230). The internal floating piston 200 by compressing spring 196 absorbs fluid volume in compression.

Operation of the flow control element of the assembly for compression is set by an externally-adjustable control mechanism as shown in FIG. 8; FIGS. 8A(t) and 8B(n) and 8C(d) show the externally adjustable mechanism in each of the three settings: FIG. 8A(t) and corresponding FIG. 7B(t) show the adjustment mechanism and portion of the assembly in a "travel adjust" setting (t); FIG. 8B(n) and corresponding FIG. 7C(n) show the adjustment mechanism and portion of the assembly in a "neutral" setting (n); FIG. 8C(d) and corresponding FIG. 7D(d) show the adjustment mechanism in a "descend" setting (d).

As shown the knob is operated by hand (e.g. directly at the system/assembly). According to an alternative embodiment, the system could be configured so that knob could be operated by a remote actuator located on the handlebar (e.g. a conventional remote actuator of a type that is or can be used for bicycles or other such vehicles); operation of the remote actuator would rotate the knob to the desired setting.

The effect of the setting of the adjustment mechanism on the corresponding flow control element and resultant flow is shown schematically in FIGS. 7E(t) and 7F(n) and 7G(d). As indicated (see also FIG. 7A), flow is supplied in a circuit from the control chamber 400 into the chamber 404 and the annular sleeve passage 406 through the flow control element (as well as through a port or orifice adjacent the cup 184).

The flow control element comprises a compression piston 172 having a central passage and a first set of shims 166a and 168a at one end and a second set of shims 166b and 168b at the other end. Counter-flow into the annular sleeve passage 406 is through a passage 416 and a radial check valve orifice 418.

At the "travel adjust" (t) setting flow is restricted such that flow occurs substantially only from a lower passage 412 of the compression piston 172 through the second set of shims 166b and 168b. See FIGS. 7E(t) and 17.

At the "neutral" (n) setting flow is restricted such that flow occurs substantially only from an upper passage at compression piston 172 through the first set of shims 166a and 168a. See FIGS. 7F(n) and 17.

As indicated in FIGS. 7E(t) and 7F(n), orifice 420 and orifice 422 are blocked by compression needle 162 at the "travel adjust" (t) setting (see FIG. 7E(t)) and the "neutral" (n) setting (see FIG. 7F(n)).

At the "descend" (d) setting flow is restricted such that flow occurs substantially only through an orifice 420 in compression needle 102 and an orifice 422 in compression shaft 164 and from upper passage 414 of the compression piston through the first set of shims 166a and 168a. See FIGS. 7G(d) and 17.

Figure 9A:
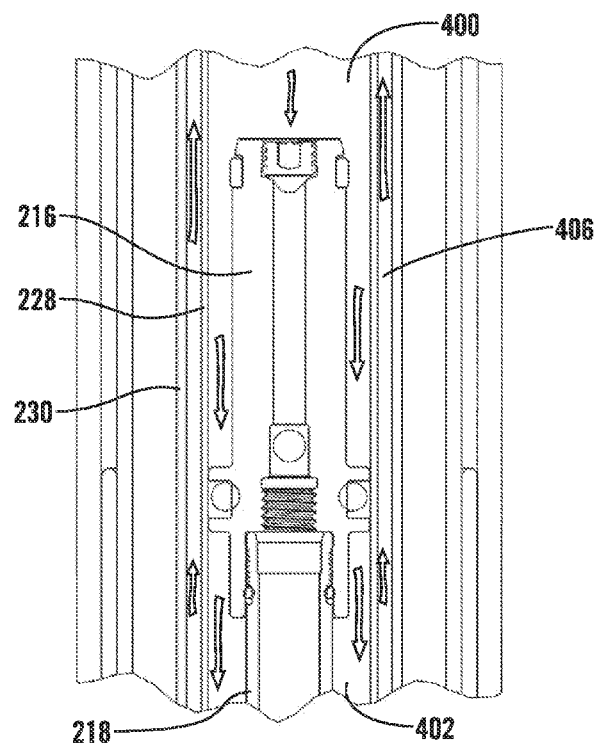
FIG. 9A is a schematic fragmentary cut-away cross-section view of an assembly of a suspension fork according to an exemplary embodiment.
Figure 9B:
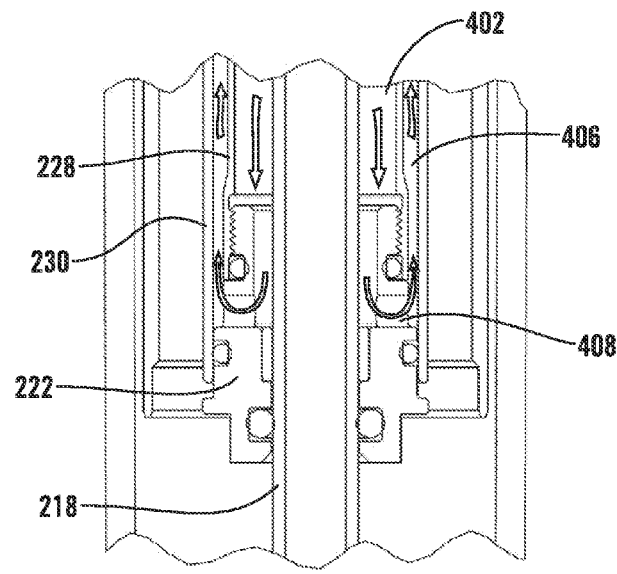
FIG. 9B is a schematic fragmentary cut-away cross-section view of an assembly of a suspension fork according to an exemplary embodiment.

The flow circuit of the assembly during rebound is shown schematically (in part) in FIGS. 9A, 9B, 10A and 10B. FIGS. 9A and 9B show flow in segments of the lower portion of the assembly; as indicated schematically, flow within the annular sleeve passage 406 is supplied to and through a port or orifice 408 at the base (within the end cap 222) as counter-flow into the substantially central chamber 400/402 (e.g. restore position of piston 200).

Figure 10A:
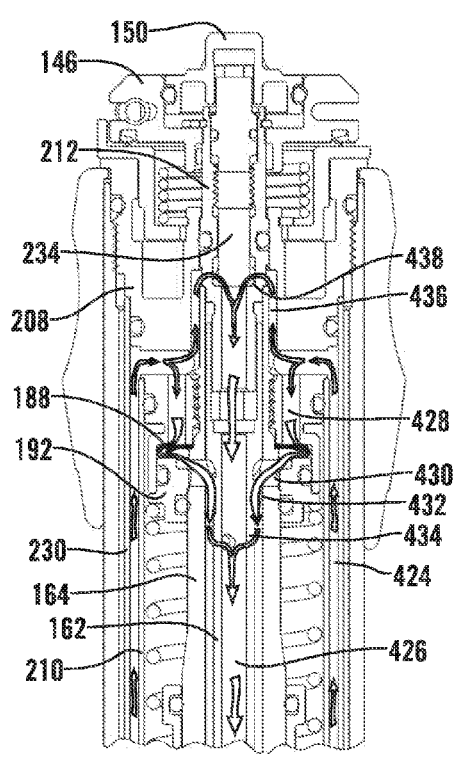
FIG. 10A is a schematic fragmentary cut-away cross-section view of an assembly of a suspension fork according to an exemplary embodiment.
Figure 10B:
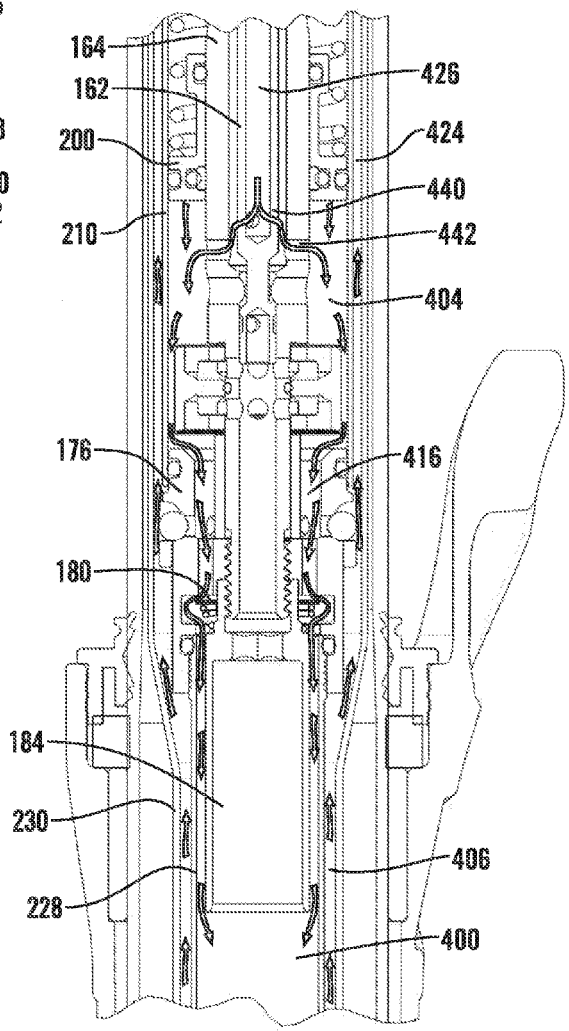
FIG. 10B is a schematic fragmentary cut-away cross-section view of an assembly of a suspension fork according to an exemplary embodiment.

FIGS. 10A and 10B show flow in segments of the upper portion of the assembly; as indicated schematically, flow within the annular sleeve passage 406/424 is supplied to and through a flow control element into a passage 436 and passage 438 as well as into passage 428 and through orifice 430 and helical passage 432 and through orifice 434 into central passage 426 in compression needle 162; flow is provided from central passage 426 through orifice 440 in compression needle 162 and through orifice 442 in compression shaft 164 to chamber 404 adjacent internal floating piston 200 through passage 416 adjacent piston adapter 176 past shim 180 and into chamber 400 as counter-flow.

Operation of the flow control element of the assembly for rebound is set by an externally-adjustable mechanism as shown schematically in FIGS. 11A(q) and 11B(s). As indicated, the mechanism can be set at any position between two terminal settings corresponding generally to a "quick" rebound flow setting (q) (shown schematically in FIGS. 11A(q) and 12A(q)) and a "slow" rebound flow setting (s) (shown schematically in FIGS. 11B(s) and 12B(s)). See also FIG. 18.

At the "quick" flow (q) setting counter-flow is permitted at the flow control element into passage 436 in compression shaft and through passage 438 between rebound needle 234 and compression adjuster 212 and into passage 426. See FIG. 12C(q).

At the "slow" flow (s) setting, counter-flow is restricted at the flow control element and blocked at passage 438 by rebound needle 234 and directed through passage 428 past shim 188 through orifice 430 in compression shaft into helical passage 432 through orifice 434 in compression needle 162 into passage 426. See FIG. 12D(s).

Referring to FIGS. 13D, 13E and 13F the assembly is shown schematically (in part) in three progressively expanded (e.g. rebounding) stages of operation that would occur during operation/use. See also FIG. 19.

Elements of the fluid flow circuit of the assembly including floating piston 200 are shown generally in FIGS. 13G(t) to 13I(t) (at "t" setting) and 14A(n/d) to 14C(n/d) (at "n" setting or "d" setting).

Figure 13I:
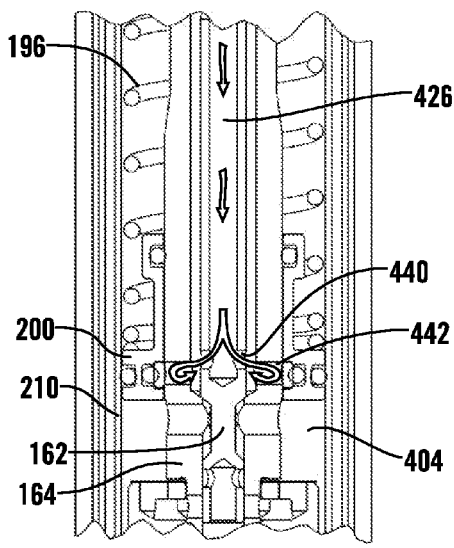
FIG. 13I is a schematic fragmentary cut-away cross-section view of an assembly of a suspension fork according to an exemplary embodiment.

In FIGS. 13G(t), 13H(t) and 13I(t) rebound flow circuit of the assembly is shown at the "travel adjust" (t) setting. As the internal floating piston 200 travels along compression shaft 164 the fluid flows in central passage 426 through orifice 440 in compression needle 162 and through orifice 442 in compression shaft 164 into chamber 404. See FIGS. 13G(t) and 13H(t). When piston 200 approaches the end of the path of travel along shaft 164 flow/through orifice 442 is restricted and blocked by piston 200 and movement of piston 200 is stopped. See FIG. 13I(t).

Figure 12C:
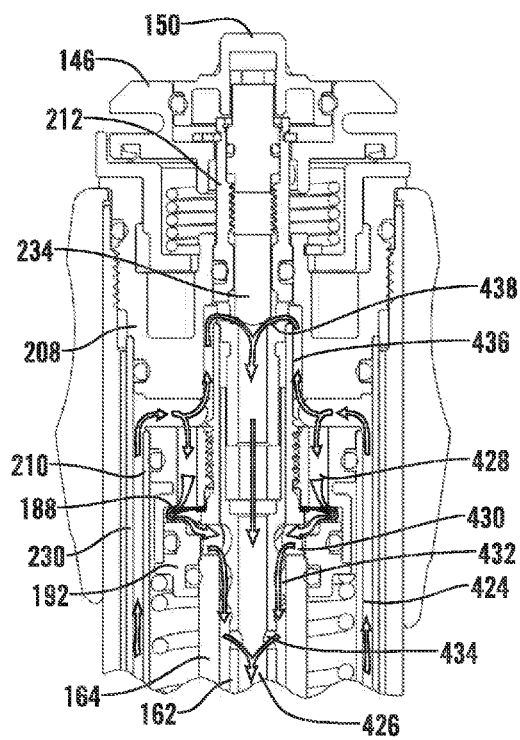
FIG. 12C is a schematic fragmentary cut-away cross-section view of an assembly of a suspension fork according to an exemplary embodiment.
Figure 12D:
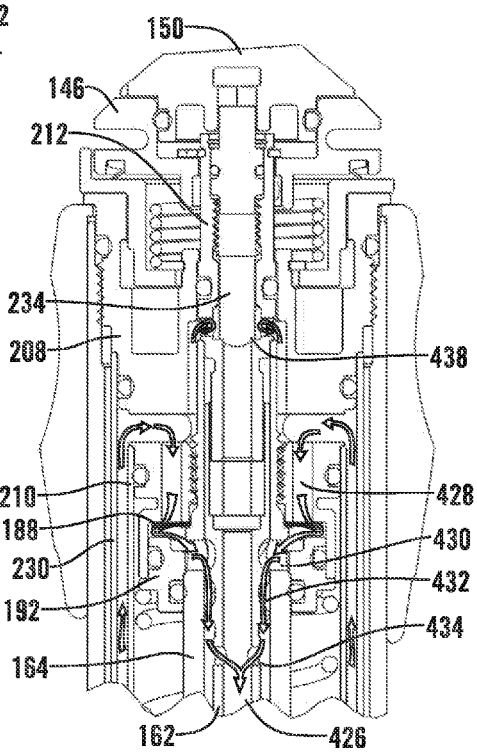
FIG. 12D is a schematic fragmentary cut-away cross-section view of an assembly of a suspension fork according to an exemplary embodiment.
Figure 14C:
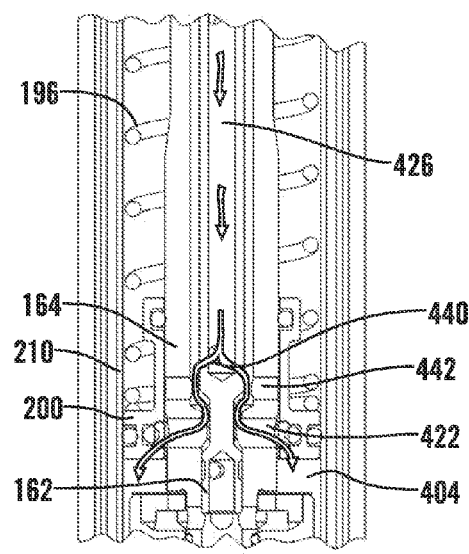
FIG. 14C is a schematic fragmentary cut-away cross-section view of an assembly of a suspension fork according to an exemplary embodiment.

In FIGS. 12C(n/d), 14A(n/d) and 14B(n/d) the rebound flow circuit of the assembly is shown at the "neutral" (n) setting or "descend" (d) setting. The internal floating piston 200 travels along compression shaft 164; fluid flows in central passage 426 through orifice 440 in compression needle 162 and through orifice 442 (upper) in compression shaft 164 as well as through orifice 422 (lower) in compression shaft 164 into chamber 404. See FIGS. 14A(n/d) and 14B(n/d). When piston 200 approaches the end of the path of travel along shaft 164 flow through orifice 442 is restricted and blocked by piston 200 but flow continues through orifice 422 into chamber 404. See FIG. 14C(n/d).

As indicated, at the "travel adjust" (t) setting the length of the path of travel of the internal floating piston 200 is reduced and therefore the rebound stroke of the fork is reduced. Compare FIGS. 13I(t) and 14C(n/d). See also FIG. 19. The internal floating piston 200 is returned to its initial position (acted upon by spring 196 as dictated by the volume of fluid in the circuit) when the flow circuit is changed to the "neutral" (n) or "descend" (d) setting.

Air Vent/Spring Effect

Figure 15A:
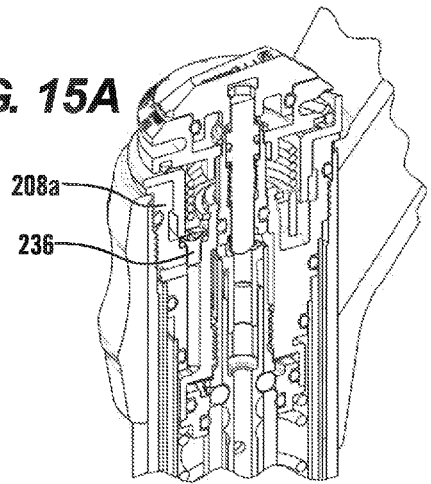
FIG. 15A is a schematic fragmentary cut-away perspective view of an assembly of a suspension fork according to an exemplary embodiment.
Figure 15:
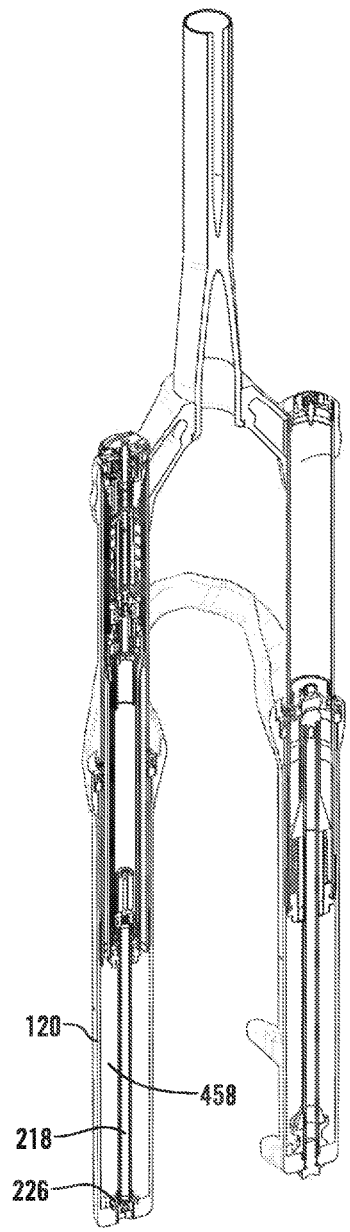
FIG. 15 is a schematic cut-away perspective view of a suspension fork for a bicycle according to an exemplary embodiment.
Figure 15B:
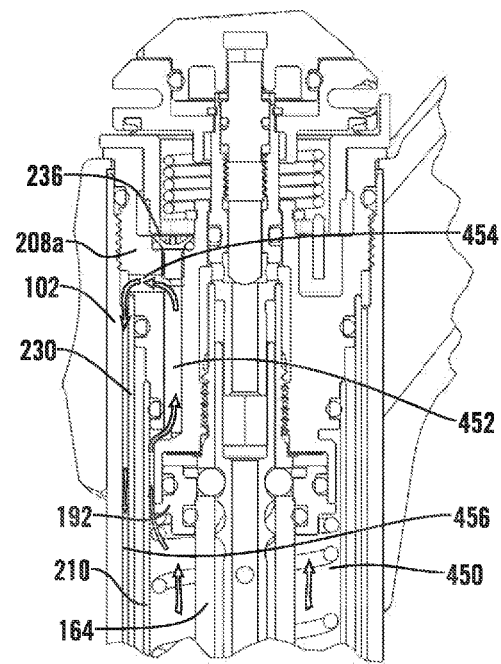
FIG. 15B is a schematic fragmentary cut-away cross-section view of an assembly of a suspension fork according to an exemplary embodiment.

Referring to FIGS. 15 and 16, the effect of an air vent is indicated schematically. The assembly shown in FIGS. 15, 15A and 15B provides an air vent shown as orifice 454 in top cap 208a; in compression flow of entrapped air is vented through passage 450 and passage 452 through orifice 454 and returned as counter-flow into passage 456. See FIG. 15B.

The assembly shown in FIGS. 16, 16A and 16B according to an alternative embodiment does not provide an air vent; in compression flow of entrapped air through passage 450 and passage 452 is blocked. See FIG. 16B. (The top cap 208b provides no orifice or vent for air.) Entrapped air compression by movement of the mechanism may provide a spring effect for the assembly; according to exemplary embodiments, the parameters of the spring effect may selectively be modified by configuration of the passages/chambers.

System Performance/Performance Curves

The compression system assembly of the front suspension fork provides for externally-accessibly adjustment providing adjustment controls (e.g. knobs) at the top of the leg or casting/housing containing the compression assembly. The configuration of the externally-accessible adjustment mechanisms provides a rider of a bicycle with the front suspension fork with the ability to conveniently make adjustments to "tune" the performance of the compression assembly of the fork (e.g. before a ride or during a ride or after a ride in preparation for the next ride).

As indicated, the adjustment of compression setting is independent of the adjustment of the rebound setting (changing one setting does not change the other setting).

Figure 17:
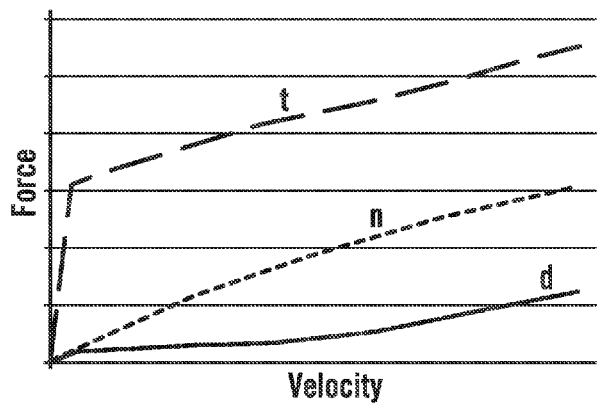
FIG. 17 is a schematic diagram of expected performance of a suspension fork according to an exemplary embodiment.
Figure 18:
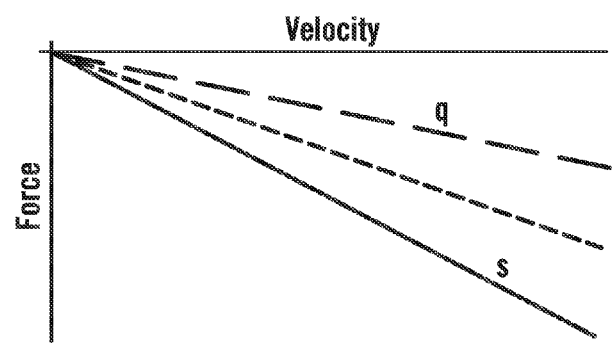
FIG. 18 is a schematic diagram of expected performance of a suspension fork according to an exemplary embodiment.
Figure 19:
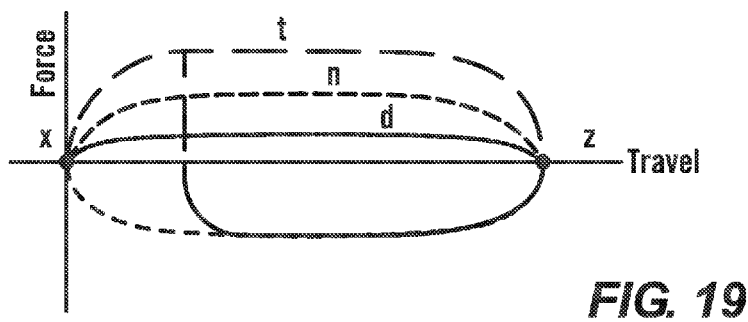
FIG. 19 is a schematic diagram of expected performance of a suspension fork according to an exemplary embodiment.

The compression system and the rebound system operate (as adjusted) together to define the flow characteristics of the damping system of the fork, as indicated in FIGS. 17, 18 and 19. FIGS. 17-19 are schematic representations of force-velocity curves for the damper assembly or system. As indicated, the force-velocity curves represent schematically in composite of the performance of the system. Different settings for the adjustment mechanisms provide (in composite) performance of the system along a different curve or profile as shown in FIGS. 17-19. The profile of the respective the force-velocity curves is determined by the configuration and performance of the system at a particular setting.

FIG. 17 shows schematically the force-velocity response of the assembly under conditions of operation during compression at each of the three distinct settings (t, n and d). Relatively greater force is required for compression at the "travel adjust" (t) setting than at the "neutral" (n) setting and the "descend" (d) setting.

FIG. 18 shows schematically the force-velocity response of the assembly under conditions of operation during rebound with the range between the two terminal settings (q and s); FIG. 18 also indicates performance at any of the range of intermediate settings between the two terminal settings. The relative rebound response of restoration to the uncompressed stroke length of the system is fastest at the "quick" setting (q) and progressively slowed as adjusted toward the "slow" setting (s).

FIG. 19 shows schematically the full travel path (e.g. full stroke) of the assembly under conditions of operation during the compression-rebound cycle at the requisite levels of force/load for each of the three distinct compression adjustment settings (t, n, d). As indicated, at the "travel adjust" (t) setting, the traveled stroke length is shortened. As shown in FIG. 19, when the setting is changed to "travel adjust" the first stroke would start at the "zero" point; each subsequent stroke would follow the path/loop marked (with reference letter "t") (e.g. with the stroke returning to the end of travel/stop position of the internal floating piston).

It is important to note that the construction and arrangement of the elements of the inventions as described in this application and as shown in the figures above is illustrative only. Although some embodiments of the present inventions have been described in detail in this disclosure, those skilled in the art who review this disclosure will readily appreciate that many modifications are possible without materially departing from the novel teachings and advantages of the subject matter recited. Accordingly, all such modifications are intended to be included within the scope of the present inventions. Other substitutions, modifications, changes and omissions may be made in the design, operating conditions and arrangement of the preferred and other exemplary embodiments without departing from the spirit of the present inventions.

It is important to note that the system and method of the present inventions can comprise conventional technology (e.g. as implemented in present configuration) or any other applicable technology (present or future) that has the capability to perform the functions and processes/operations indicated in the FIGURES. All such technology is considered to be within the scope of the present inventions and application.

The invention claimed is:

1. A suspension system for use in a vehicle comprising:
    (a) a damper assembly comprising an internal floating piston assembly configured to operate with a stroke providing a path with an available a length of travel between a zero point of travel and an end point of travel; and
    (b) an adjustment system configured to provide a first setting and a second setting for the damper assembly; wherein at the first setting the adjustment system is configured to provide a travel-adjust point of travel on the path of the stroke between the zero point of travel and the end point of travel to define a shortened path between the travel-adjust point of travel and the end point of travel;
    wherein at the second setting the available path of the stroke is between the zero point of travel and the end point of travel;
    so that at the first setting the available length of travel of the stroke in the shortened path is greater than zero but reduced to a portion of the full length of travel between the travel-adjust point of travel and the end point of travel and at the second setting the available length of travel of the stroke may comprise a full length of travel between the zero point of travel and the end point of travel.

2. The suspension system of claim 1 wherein at the second setting of the adjustment system the path of the stroke is configured to provide a loop between the zero point of travel and end point of travel wherein the available length of travel is not reduced; and wherein at the first setting of the adjustment system the shortened path of the stroke is configured to provide a shortened loop wherein the available length of travel is reduced.

3. The suspension system of claim 1 comprising a hydraulic fluid; wherein fluid flow comprises flow of the hydraulic fluid.

4. The suspension system of claim 1 wherein the adjustment system comprises an adjustment mechanism; and wherein the adjustment mechanism is externally accessible.

5. The suspension system of claim 1 further comprising a chamber for the internal floating piston assembly comprising a flow control element; wherein the internal floating piston assembly is configured to obstruct fluid flow at the flow control element; wherein the flow control element comprises an orifice and the internal floating piston assembly is configured to obstruct fluid flow at the orifice.

6. The suspension system of claim 1 wherein the adjustment system is configured to provide a third setting for compression damping.

7. The suspension system of claim 6 wherein the relative degree of restriction of fluid flow is greater in the first setting than in the second setting and greater in the second setting than in the third setting.

8. The suspension system of claim 1 wherein the damper assembly comprises a first fluid flow orifice; wherein the length of travel comprises a stroke to absorb impact in compression; wherein at the first setting the internal floating piston assembly blocks fluid flow through the first fluid flow orifice to reduce the stroke.

9. The suspension system of claim 1 wherein the damper assembly comprises a compression assembly and a rebound assembly.

10. The suspension system of claim 9 wherein the adjustment system comprises an adjustment mechanism for the compression assembly and an adjustment mechanism for the rebound assembly; wherein the adjustment mechanism for the compression assembly comprises a compression adjuster; wherein the adjustment mechanism for the rebound assembly comprises a rebound adjuster.

11. The suspension system of claim 10 wherein the compression adjuster comprises adjuster knob providing for externally accessible adjustment of the compression assembly; wherein the compression assembly comprises a compression needle and wherein rotation of the compression adjuster knob providing axial translation of the compression needle; and wherein the compression assembly comprises at least one shim stack comprising a set of shim springs operating as a flow control element.

12. The suspension system of claim 10 wherein the adjustment system provides for adjustment of the compression assembly by the adjustment mechanism for the compression assembly and for adjustment of the rebound assembly by the adjustment mechanism for the rebound assembly; wherein adjustment of the compression assembly is independent of the adjustment of the rebound assembly.

13. The suspension system of claim 10 wherein the rebound adjuster is externally-accessible and wherein operation of a flow control element for fluid flow in rebound is set by the rebound adjuster at any position between two terminal settings corresponding generally to a quick rebound flow setting and a slow rebound flow setting.

14. The suspension system of claim 10 wherein the compression adjuster comprises a knob configured to be operated by a remote actuator.

15. The suspension system of claim 1 further comprising a hydraulic bottom out mechanism comprising a bottom-out cup and a bottom-out piston configured to enter the bottom-out cup.

16. The suspension system of claim 1 wherein at the first setting when the internal floating piston assembly approaches the end of travel along a compression shaft fluid flow through a first orifice in the compression shaft is restricted and blocked by the internal floating piston assembly and fluid flow through a second orifice in the compression shaft is blocked by a compression needle and movement of the internal floating piston assembly is stopped, and wherein at the second setting and a third setting when the internal floating piston assembly approaches the end of travel along the compression shaft flow through the first orifice in the compression shaft is restricted and blocked by the internal floating piston assembly but fluid flow continues through the second orifice in the compression shaft into a chamber.

17. The suspension system of claim 1 wherein the internal floating piston assembly is biased by a spring.

18. The suspension system of claim 17 wherein the spring is coil spring.

19. A front suspension fork for a bicycle configured to contain a hydraulic fluid for fluid flow and in a flow path providing for compression damping and for rebound damping comprising:
(a) a compression system providing a compression stroke distance between a zero point of travel and an end point of travel;
(b) a rebound system;
(c) a first adjustment mechanism configured to modify compression damping and to modify travel;
(d) a second adjustment mechanism configured to modify rebound damping;
wherein to modify travel comprises providing a travel-adjust point of travel between the zero point of travel and the end point of travel and reducing the available compression stroke distance to a reduced portion of travel between the travel-adjust point of travel and the end point of travel;
wherein the reduced portion of travel between the travel-adjust point of travel and the end point of travel is greater than the zero point of travel; and
wherein the compression system is configured to operate at a plurality of settings.

20. The fork of claim 19 wherein the second adjustment mechanism is co-located with the first adjustment mechanism.

21. The fork of claim 19 wherein the first adjustment mechanism comprises a first knob and wherein the second adjustment mechanism comprises a second knob; wherein the first knob is co-located with the second knob.

22. The fork of claim 19 wherein the rebound system operates within a variable range of settings for relative speed of rebound response for the system between: (1) a first rebound setting and (2) a second rebound setting; and wherein the relative speed of rebound response at the first setting is more quick than the relative speed of rebound response at the second setting.

23. The fork of claim 19 wherein the configuration of settings for the compression system and for the rebound system determines the flow path of fluid flow and performance characteristics of the compression system and rebound system.

24. A damper assembly configured to contain a hydraulic fluid for fluid flow in a flow path and to operate within an available length of travel between a zero point of travel and an end point of travel to define a full length of travel comprising:
(a) a compression assembly comprising a piston assembly;
(b) a rebound system;
(c) a first adjuster configured to adjust settings for the compression assembly; and
(d) a second adjuster configured to adjust settings for the rebound assembly;
wherein settings for the compression assembly can be configured to modify compression damping characteristics and to provide an adjust point of travel between the zero point of travel and the end point of travel to reduce available travel to a portion of the full length of travel on a shortened path between the adjust point of travel and the end point of travel;
wherein the portion of the full length of travel on the shortened path between the adjust point of travel and the end point of travel is greater than the zero point of travel;
wherein settings for the rebound assembly modify rebound damping characteristics.

25. The assembly of claim 24 wherein the piston assembly comprises an internal floating piston on a compression shaft and the compression assembly comprises a compression needle.

26. The assembly of claim 25 wherein the first adjuster is configured to be set to modify travel; wherein when the first adjuster is set to modify travel the internal floating piston on the compression shaft is positioned to restrict flow of fluid through a first orifice; wherein when the first adjuster is set to modify travel the compression needle is positioned to restrict flow through a second orifice.

27. The assembly of claim 24 wherein the compression assembly is configured to operate at three distinct settings for performance adjustment of relative compression response: (1) a travel adjust setting; (2) a neutral setting; and (3) a descend setting.

28. The assembly of claim 27 wherein the relative degree of restriction of fluid flow is greater in the travel adjust setting than in the neutral setting and greater in the neutral setting than in the descend setting; wherein at the travel adjust setting the length of a path of travel of the internal floating piston is reduced and therefore a rebound stroke distance of the fork is reduced.

29. The assembly of claim 28 wherein the internal floating piston is configured to be returned to its initial position when the first adjuster is changed to the neutral setting or the descend setting.

30. The assembly of claim 24 wherein the first adjuster and the second adjuster are externally-accessible.

31. The assembly of claim 24 wherein the setting of the first adjuster is independent of the setting of the second adjuster.

32. The assembly of claim 24 wherein the compression assembly is configured to operate at four distinct settings for performance adjustment of relative compression response: (1) a first travel adjust setting; (2) a second travel adjust setting; (3) a neutral setting; and (4) a descend setting.

33. The assembly of claim 24 wherein the first adjuster comprises a knob operated by a remote actuator.

* * * * *